(12) United States Patent
King et al.

(10) Patent No.: US 7,594,182 B2
(45) Date of Patent: Sep. 22, 2009

(54) DYNAMIC AND USER-DEFINED EVENTS FOR A GRAPHICAL PROGRAM

(75) Inventors: Jason S. King, Austin, TX (US); B. Craig Smith, Austin, TX (US)

(73) Assignee: National Insturments Corporation, Austin, TX (US)

( * ) Notice: Subject to any disclaimer, the term of this patent is extended or adjusted under 35 U.S.C. 154(b) by 1681 days.

(21) Appl. No.: 10/218,701

(22) Filed: Aug. 14, 2002

(65) Prior Publication Data

US 2003/0071842 A1     Apr. 17, 2003

Related U.S. Application Data

(63) Continuation-in-part of application No. 09/976,726, filed on Oct. 12, 2001.

(51) Int. Cl.
- G06F 15/00 (2006.01)
- G06F 17/00 (2006.01)
- G06F 3/00 (2006.01)
- G06F 9/00 (2006.01)

(52) U.S. Cl. .................. 715/763; 715/764; 715/738; 715/810; 715/735; 715/771; 715/846; 715/700

(58) Field of Classification Search ............. 715/764, 715/738, 810, 735, 771, 846, 763, 700
See application file for complete search history.

(56) References Cited

U.S. PATENT DOCUMENTS

| 4,849,880 A | 7/1989 | Bhaskar et al. |
| 5,175,855 A | 12/1992 | Putnam et al. |

(Continued)

OTHER PUBLICATIONS

"Simulink Using Simulink, Version 4," Nov. 2000, Front page, Table of Contents, pp. 3-14-3-18, 5-26-5-29, 8-1-8-13, 9-261-9-262.

(Continued)

*Primary Examiner*—Kieu Vu
*Assistant Examiner*—Sabrina Greene
(74) *Attorney, Agent, or Firm*—Meyertons Hood Kivlin Kowert & Goetzel, P.C.; Jeffrey C. Hood; Jason L. Burgess

(57) ABSTRACT

One embodiment of the invention comprises a system and method for enabling a graphical program to dynamically register one or more events during execution of the graphical program. An event registration node may be displayed in the block diagram of the graphical program. One or more events may be associated with the event registration node. The event registration node may be operable to dynamically register the one or more events during execution of the graphical program. Another embodiment of the invention comprises a system and method for enabling a graphical program to programmatically generate and respond to a user-defined event. The user may desire to define custom, i.e., user-defined, events for use in a graphical program.

33 Claims, 12 Drawing Sheets

U.S. PATENT DOCUMENTS

| | | | |
|---|---|---|---|
| 5,301,336 A * | 4/1994 | Kodosky et al. | 715/846 |
| 5,479,643 A | 12/1995 | Bhaskar et al. | |
| 5,760,788 A | 6/1998 | Chainini et al. | |
| 6,425,120 B1 | 7/2002 | Morganelle et al. | |
| 6,425,121 B1 | 7/2002 | Phillips | |
| 6,684,385 B1 * | 1/2004 | Bailey et al. | 717/109 |
| 6,701,513 B1 | 3/2004 | Bailey | |

OTHER PUBLICATIONS

"Stateflow User's Guide, Version 4," Oct. 2001, Front page, Table of Contents, Chapters 1-5.

Cox, Philip T. and Tomasz Pietrzykowski, "Visual Message Flow Language MFL and Its Interface," Advanced Visual Interfaces, 1992, (12 pages).

* cited by examiner

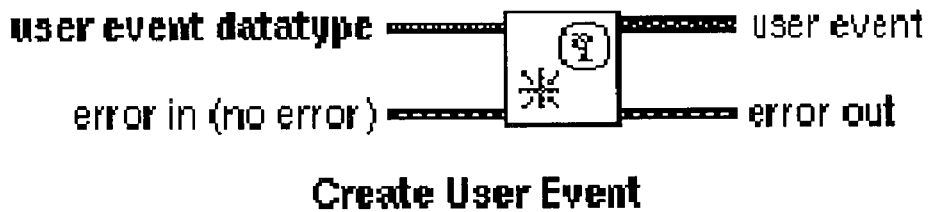

Create User Event

Returns a reference to a user-defined event. The event's name and datatype is determined by the event cluster input. The output reference can be wired to a Register For Events node to listen for the event, or a Fire User Event node to send the event and associated data.

FIG. 8

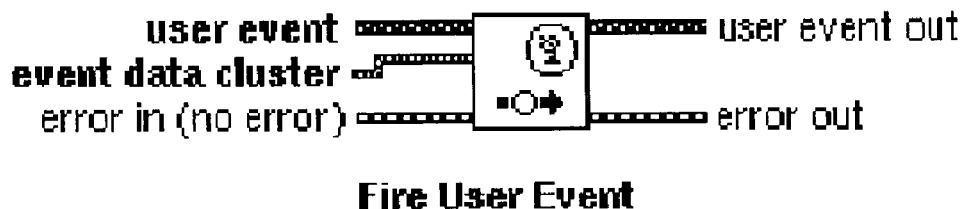

Fire User Event

Posts the given user event. The event and associated data will be queued for all event structures registered for the event.

FIG. 9

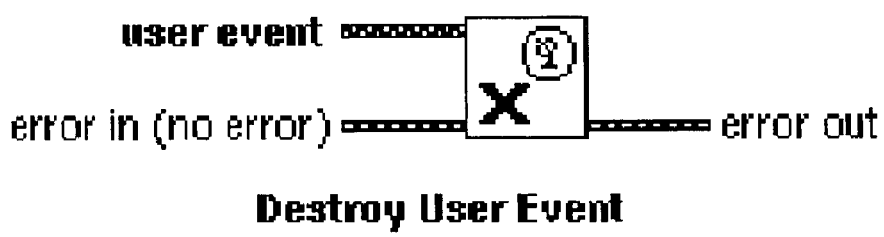

Destroy User Event

Releases and destroys a user-defined event reference.

FIG. 10

DYNAMIC AND USER-DEFINED EVENTS FOR A GRAPHICAL PROGRAM

PRIORITY CLAIM

The present invention is a continuation-in-part of U.S. patent application Ser. No. 09/976,726, titled, "System and Method for Enabling a Graphical Program to Respond to User Interface Events", which was filed on Oct. 12, 2001, and whose inventors were Jason King, Craig Smith, Greg McKaskle, and Andrew Dove.

FIELD OF THE INVENTION

The present invention relates to the field of computer software, and more particularly to the field of graphical programming. One embodiment of the invention relates to dynamically registering one or more events during execution of a graphical program. Another embodiment of the invention relates to creating user-defined events for a graphical program.

DESCRIPTION OF THE RELATED ART

Traditionally, high level text-based programming languages have been used by programmers in writing application programs. Many different high level programming languages exist, including BASIC, C, Java, FORTRAN, Pascal, COBOL, ADA, APL, etc. Programs written in these high level languages are translated to the machine language level by translators known as compilers or interpreters. The high level programming languages in this level, as well as the assembly language level, are referred to herein as text-based programming environments.

Increasingly, computers are required to be used and programmed by those who are not highly trained in computer programming techniques. When traditional text-based programming environments are used, the user's programming skills and ability to interact with the computer system often become a limiting factor in the achievement of optimal utilization of the computer system.

There are numerous subtle complexities which a user must master before he can efficiently program a computer system in a text-based environment. The task of programming a computer system to model or implement a process often is further complicated by the fact that a sequence of mathematical formulas, steps or other procedures customarily used to conceptually model a process often does not closely correspond to the traditional text-based programming techniques used to program a computer system to model such a process. In other words, the requirement that a user program in a text-based programming environment places a level of abstraction between the user's conceptualization of the solution and the implementation of a method that accomplishes this solution in a computer program. Thus, a user often must substantially master different skills in order to both conceptualize a problem or process and then to program a computer to implement a solution to the problem or process. Since a user often is not fully proficient in techniques for programming a computer system in a text-based environment to implement his solution, the efficiency with which the computer system can be utilized often is reduced.

Examples of fields in which computer systems are employed to interact with physical systems are the fields of instrumentation, process control, industrial automation, and simulation. Computer measurement and control of devices such as instruments or industrial automation hardware has become increasingly desirable in view of the increasing complexity and variety of instruments and devices available for use. However, due to the wide variety of possible testing and control situations and environments, and also the wide array of instruments or devices available, it is often necessary for a user to develop a custom program to control a desired system.

As discussed above, computer programs used to control such systems traditionally had to be written in text-based programming languages such as, for example, assembly language, C, FORTRAN, BASIC, etc. Traditional users of these systems, however, often were not highly trained in programming techniques and, in addition, text-based programming languages were not sufficiently intuitive to allow users to use these languages without training. Therefore, implementation of such systems frequently required the involvement of a programmer to write software for control and analysis of instrumentation or industrial automation data. Thus, development and maintenance of the software elements in these systems often proved to be difficult.

U.S. Pat. Nos. 4,901,221; 4,914,568; 5,291,587; 5,301,301; and 5,301,336; among others, to Kodosky et al disclose a graphical system and method for modeling a process, i.e., a graphical programming environment which enables a user to easily and intuitively model a process. The graphical programming environment disclosed in Kodosky et al can be considered a higher and more intuitive way in which to interact with a computer. A graphically based programming environment can be represented at a level above text-based high level programming languages such as C, Basic, Java, etc.

The method disclosed in Kodosky et al allows a user to construct a diagram using a block diagram editor. The block diagram may include a plurality of interconnected icons such that the diagram created graphically displays a procedure or method for accomplishing a certain result, such as manipulating one or more input variables and/or producing one or more output variables. In response to the user constructing a diagram or graphical program using the block diagram editor, data structures and/or program instructions may be automatically constructed which characterize an execution procedure that corresponds to the displayed procedure. The graphical program may be compiled or interpreted by a computer.

Therefore, Kodosky et al teaches a graphical programming environment wherein a user places or manipulates icons and interconnects or "wires up" the icons in a block diagram using a block diagram editor to create a graphical "program." A graphical program for performing an instrumentation, measurement or automation function, such as measuring a Unit Under Test (UUT) or device, controlling or modeling instruments, controlling or measuring a system or process, or for modeling or simulating devices, may be referred to as a virtual instrument (VI). Thus, a user can create a computer program solely by using a graphically based programming environment. This graphically based programming environment may be used for creating virtual instrumentation systems, modeling processes, control, simulation, and numerical analysis, as well as for any type of general programming.

A graphical program may have a graphical user interface. For example, in creating a graphical program, a user may create a front panel or user interface panel. The front panel may include various graphical user interface elements or front panel objects, such as user interface controls and/or indicators, that represent or display the respective input and output that will be used by the graphical program or VI, and may include other icons which represent devices being controlled. The front panel may be comprised in a single window of user interface elements, or may comprise a plurality of individual windows each having one or more user interface elements, wherein the individual windows may optionally be tiled together. When the controls and indicators are created in the front panel, corresponding icons or terminals may be automatically created in the block diagram by the block diagram editor. Alternatively, the user can place terminal icons in the block diagram which may cause the display of corresponding front panel objects in the front panel, either at edit time or later at run time. As another example, the front panel may comprise front panel objects, e.g., the GUI, embedded in the block diagram.

During creation of the block diagram portion of the graphical program, the user may select various function nodes or icons that accomplish his desired result and connect the function nodes together. For example, the function nodes may be connected in one or more of a data flow, control flow, and/or execution flow format. The function nodes may also be connected in a "signal flow" format, which is a subset of data flow. The function nodes may be connected between the terminals of the various user interface elements, e.g., between the respective controls and indicators. Thus the user may create or assemble a graphical program, referred to as a block diagram, graphically representing the desired process. The assembled graphical program may be represented in the memory of the computer system as data structures and/or program instructions. The assembled graphical program, i.e., these data structures, may then be compiled or interpreted to produce machine language that accomplishes the desired method or process as shown in the block diagram.

Input data to a graphical program may be received from any of various sources, such as from a device, unit under test, a process being measured or controlled, another computer program, or from a file. Also, a user may input data to a graphical program or virtual instrument using a graphical user interface, e.g., a front panel as described above. The input data may propagate through the data flow block diagram or graphical program and appear as changes on the output indicators. In an instrumentation application, the front panel can be analogized to the front panel of an instrument. In an industrial automation application the front panel can be analogized to the MMI (Man Machine Interface) of a device. The user may adjust the controls on the front panel to affect the input and view the output on the respective indicators. Alternatively, the front panel may be used merely to view the input and output, or just the output, and the input may not be interactively manipulable by the user during program execution.

Thus, graphical programming has become a powerful tool available to programmers. Graphical programming environments such as the National Instruments LabVIEW product have become very popular. Tools such as LabVIEW have greatly increased the productivity of programmers, and increasing numbers of programmers are using graphical programming environments to develop their software applications. In particular, graphical programming tools are being used for test and measurement, data acquisition, process control, man machine interface (MMI), supervisory control and data acquisition (SCADA) applications, simulation, machine vision applications, and motion control, among others.

In parallel with the development of the graphical programming model, a programming model referred to as "event-driven programming" has become increasingly common in recent years. Many early programs operated in a pre-determined, sequential fashion. For example, before the rise of event-driven programming, a typical program would perform a pre-determined sequence of actions, such as: perform some processing, display the results, wait for a user response, perform more processing, etc. However, as applications became more sophisticated and new window-based user interface systems were developed, the event-driven programming model was adopted. In event-driven programming, the program code is written so that the program can respond to various types of external events as they occur. The program itself has little or no control over the sequence and choice of events generated, but simply responds by carrying out the appropriate actions in response to the generated events.

Many types of events may be referred to as user interface events. User interface events are typically initiated by a person interacting with the graphical user interface of a program. User interface events may be generated as natural products of the normal operation of window-based user interface systems such as those provided by the Macintosh Operating System, Microsoft Windows, the X Window System, and the Java Abstract Window Toolkit. Such user interface events indicate user behavior with respect to the user interface elements that make up an application's graphical user interface (e.g., mouse movements with respect to application windows, keyboard presses with respect to application input fields, mouse clicks with respect to application buttons, menus, and lists).

For example, consider a program with a graphical user interface that includes a button user interface element. When a user pushes the button during operation of the program, a "button push" event may be generated in response. If a portion of the program has been associated with button push events for that button, then that portion of the program would take control in response to the generated button push event and respond in some way. Different programming environments utilize different techniques for associating a portion of a program with an event. For example, many text-based programming environments enable event handler procedures or callback routines to be registered for various events.

In addition to events being generated in response to user actions, events may also be programmatically generated by program instructions of the program itself. For example, a programnmer may write a program operable to explicitly, i.e., programmatically, generate certain user interface events, e.g., to "artificially" interact with the graphical user interface, e.g., for simulation purposes. Also, other types of events are possible in addition to user interface events. Examples of other types of events include: system events; events generated in response to data acquired from a device; events generated during playback of digital audio or video; timer events, etc. All of these various types of events can provide the program with information about what is occurring externally to the program.

User interface events can provide a program with a great level of detailed information on a user's actions. For example, consider the seemingly simple "button push" event described above. Numerous low-level events may actually be generated during the course of pushing the button, e.g., depending on the state of the user interface before the button is clicked and/or depending on how exactly the user clicks the button. For example, clicking on the button with a mouse, tabbing to the button using the keyboard and hitting the return key, or even using speech recognition and speaking the button's label can all be said to amount to the same thing; namely, "pushing" the button. If the user pushes the button, for example, by tabbing to the button and hitting the return key, then various low-level events may be generated in response, e.g., a "get keyboard focus" event when the user tabs to the button, a "key down" event when the user presses the return key, a "key up" event when the user releases the return key, etc. The "button push" event described above may also be generated when the user releases the return key.

The exact sequence of the events that are generated, the names of these events, and the timing of the event generation may vary, e.g., depending on the particular platform or programming environment. However, the above example illustrates the concepts involved. If the programmer is interested in responding to the relatively "low-level" events, such as the "get keyboard focus" event, he may enable the program to receive and respond to this event. If, on the other hand, only the "higher-level" "button push" event is of interest, the program does not need to include any code to respond to the lower-level events. In other words, the event-driven programming model can provide the programmer with a high degree of flexibility and control in responding to the user's actions.

SUMMARY

One embodiment of the invention comprises a system and method for enabling a graphical program to dynamically register one or more events during execution of the graphical program. According to one embodiment, an event registration node may be displayed in the block diagram of the graphical program in response to user input. One or more events may be associated with the event registration node in response to user input. The event registration node may be operable to dynamically register the one or more events during execution of the graphical program. Dynamically registering the events may comprise enabling the graphical program to respond to the events. In other words, before the events are registered, the graphical program may simply ignore the events when they are generated, or the graphical program may not even receive the generated events. Once the events are dynamically registered, however, the graphical program may begin receiving and responding to the events as they are generated.

One or more portions of graphical source code may be included in the block diagram for responding to one or more of the dynamically registered events. A portion of graphical source code may include one or more nodes, programmatic structures (e.g., case structures, loop structures, etc.), or other elements. The user may interconnect the nodes (or other graphical program elements), e.g., to indicate data flow or control flow.

Each portion of graphical source code included in the block diagram may correspond to one of the events dynamically registered by the event registration node and may be intended to respond to the respective event. Thus, the portion of graphical source code may be executed when the corresponding event is generated. The portion of graphical source code may be executable to perform any desired process or action in response to the corresponding event. The interconnected nodes in the portion of graphical source code may visually indicate this process or action.

A portion of graphical source code may also correspond to more than one event. For example, if two separate events need to be handled identically, then a single portion of graphical source code may be associated with both events.

It may also be desirable to dynamically un-register an event at some point during execution of the graphical program. The event to be un-registered may be an event that was previously registered dynamically or may be a non-dynamically registered event, such as a statically registered event. Thus, in one embodiment of the method, an event un-registration node may also be displayed in the block diagram of the graphical program in response to user input. One or more events may be associated with the event un-registration node in response to user input.

The event un-registration node may be operable to dynamically un-register the events associated with the event un-registration node. Dynamically un-registering the events may comprise making the graphical program stop responding to the events as the events are generated. For example, for a given event, the portion of graphical source code that previously executed in response to the event being generated may no longer execute when the event is generated.

Once the graphical program has been created, the graphical program may be executed. The event registration node may execute during execution of the graphical program to dynamically register the events associated with the event registration node.

An event dynamically registered by the event registration node may subsequently be generated. The event may be generated in response to ay of various conditions or actions, e.g., depending on the type of event. For example, for a user interface event, the event may be generated in response to user input to the graphical user interface of the graphical program. As another example, for a system event, the event may be generated in response to a change in the state of the computer system. The portion of graphical source code that corresponds to the generated event may execute in response to the generated event.

The event un-registration node may also execute during execution of the graphical program to dynamically un-register the events associated with the event un-registration node. Various alternative embodiments are contemplated for dynamically registering events. For example, although the method is described above in terms of a single node being operable to dynamically register events, in another embodiment a combination of nodes or other graphical program elements may be utilized to dynamically register events. Similarly, a combination of nodes or other graphical program elements may be utilized to dynamically un-register events.

Another embodiment of the invention comprises a system and method for enabling a graphical program to programmatically generate and respond to a user-defined event. In some situations, the user may desire to define custom, i.e., user-defined, events for use in a graphical program. For example, the user may desire the graphical program to respond to certain situations for which no pre-defined event is generated.

According to one embodiment of the method, a first node may be displayed in a block diagram of the graphical program. The first node may then be configured to programmatically create or define a user-defined event. As used herein, creating the user-defined event may comprise defining the user-defined event so that the user-defined event can then be generated, e.g., by creating a reference that can be passed to another node to generate or fire the event, as described below. The first node may be operable to programmatically create the user-defined event when the first node is executed during execution of the graphical program.

A second node may also be displayed in the block diagram of the graphical program. The second node may then be configured to programmatically or dynamically register the user-defined event. In an alternative embodiment, a single node may be used to both create and register the user-defined event.

A third node may also be displayed in the block diagram of the graphical program. The third node may then be configured to programmatically generate or fire the user-defined event. Thus, when the third node is executed during execution of the graphical program, the third node may be operable to generate or fire the user-defined event. In response to the generated event, a portion of graphical source code for responding to the user-defined event may execute, as described below. Thus, in contrast to pre-defined events which are typically generated in response to pre-defined actions or conditions determined externally to the graphical program, the generation of a user-defined event may be determined by the graphical program itself. The graphical program includes graphical source code to explicitly generate the user-defined event.

One or more nodes for responding to the user-defined event may also be displayed in the block diagram of the graphical program. The user may interconnect the one or more nodes, e.g., to indicate data flow or control flow. The interconnected nodes may visually indicate functionality for responding to the user-defined event.

The one or more nodes (also referred to as a portion of graphical source code) may be executed in response to the user-defined event being generated during execution of the graphical program, e.g., in response to the third node executing to programmatically generate the user-defined event. The portion of graphical source code may be operable to perform any desired process or action to respond to the user-defined event.

It may be desirable for the graphical program to stop responding to the user-defined event at some point during execution of the graphical program. Thus, a fourth node may also be displayed in the block diagram of the graphical program. The fourth node may be configured to programmatically destroy the user-defined event. Thus, when the fourth node is executed during execution of the graphical program, the fourth node may be operable to destroy the user-defined event. Programmatically destroying the user-defined event may comprise making the graphical program stop responding to the user-define event.

Various alternative embodiments are contemplated for creating a graphical program operable to utilize user-defined events. For example, although the method is described above in terms of specific nodes for creating a user-defined event, generating the user-defined event, destroying the user-defined event, etc., in various embodiments, graphical source code for accomplishing this functionality may be structured in any of various ways and may include any number or type of graphical program elements. Also, in one embodiment, user-defined events may be statically defined at edit-time and/or automatically registered when the graphical program begins execution, so that code for accomplishing this functionality need not appear in the graphical program.

BRIEF DESCRIPTION OF THE DRAWINGS

A better understanding of the present invention can be obtained when the following detailed description of the preferred embodiment is considered in conjunction with the following drawings, in which:

FIG. 8 illustrates a Create User Event node;

FIG. 9 illustrates a Fire User Event node;

FIG. 10 illustrates a Destroy User Event node;

Figure 1:
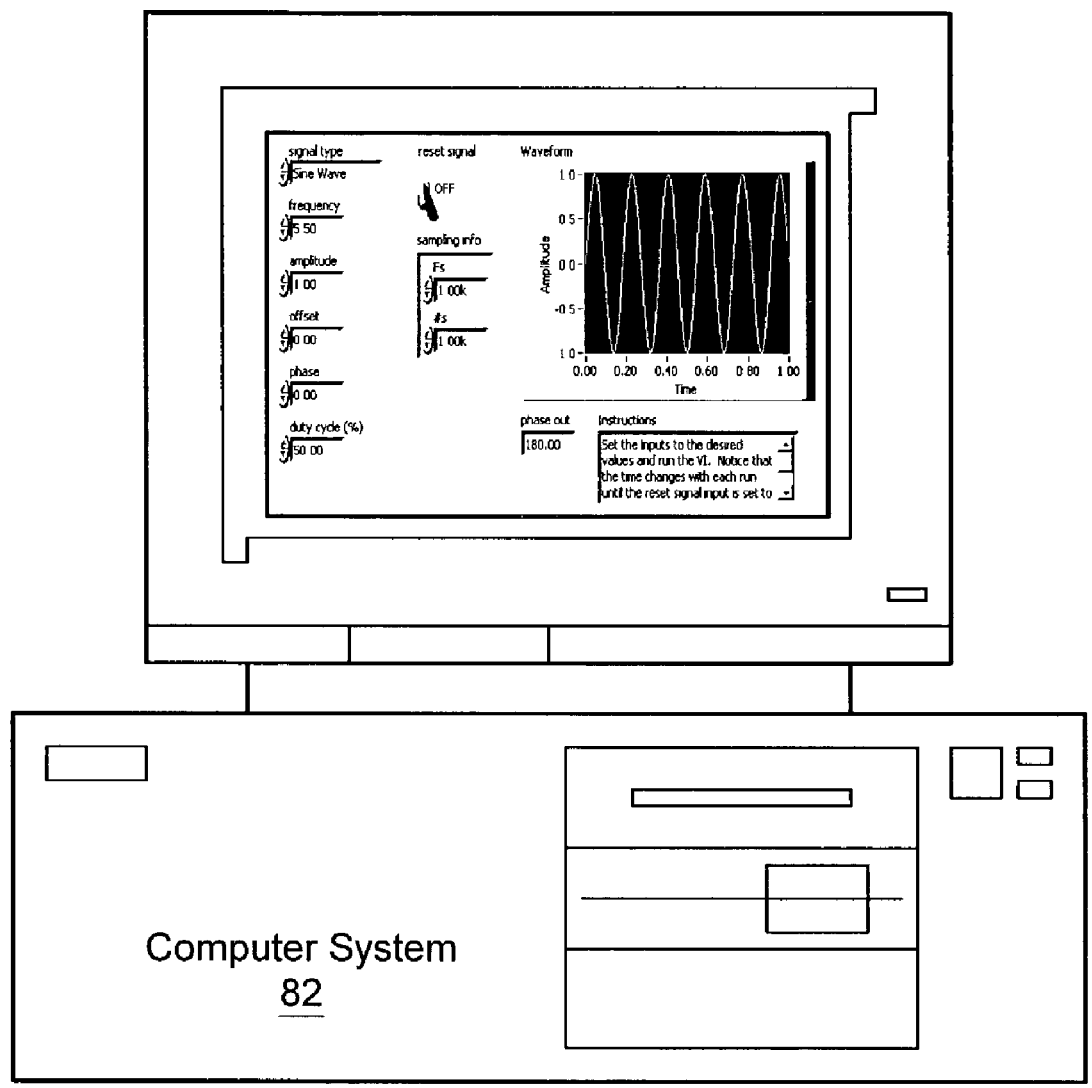
FIG. 1 illustrates a computer system operable to execute a graphical program configured to dynamically register one or more events and/or respond to one or more user-defined events.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

Incorporation By Reference

The following references are hereby incorporated by reference in their entirety as though fully and completely set forth herein:

U.S. Pat. No. 6,173,438 titled "Embedded Graphical Programming System" filed Aug. 18, 1997.

U.S. Pat. No. 6,219,628 titled "System and Method for Configuring an Instrument to Perform Measurement Functions Utilizing Conversion of Graphical Programs into Hardware Implementations," filed Aug. 18, 1997.

U.S. patent application Ser. No. 09/565,610 titled "System and Method for Encapsulating User Interface Code for a Graphical Program," filed May 4, 2000.

U.S. patent application Ser. No. 09/617,600 titled "Graphical Programming System with Distributed Block Diagram Execution and Front Panel Display," filed Jun. 13, 2000.

U.S. patent application Ser. No. 09/745,023 titled "System and Method for Programmatically Generating a Graphical Program in Response to Program Information," filed Dec. 20, 2000.

FIG. 1—Computer System

FIG. 1 illustrates a computer system 82 operable to execute a graphical program. According to one embodiment of the invention, the graphical program may be operable to dynamically register one or more events during execution of the graphical program. Dynamic event registration is described in detail below. According to another embodiment of the invention, the graphical program may be operable to respond to one or more user-defined events during execution of the graphical program. User-defined events are described in detail below.

In various embodiments, the computer system 82 may be any type of computer system, including a personal computer system, mainframe computer system, workstation, network appliance, Internet appliance, personal digital assistant (PDA), television system or other device. In general, the term "computer system" can be broadly defined to encompass any device having at least one processor that executes instructions from a memory medium.

As shown in FIG. 1, the computer system 82 may include a display device operable to display a graphical user interface or front panel of the graphical program during execution of the graphical program. The graphical user interface may comprise any type of graphical user interface, e.g., depending on the computing platform. In one embodiment the graphical user interface may comprise one or more windows, such as those used in window-based user interface systems such as provided by the Macintosh Operating System, Microsoft Windows, the X Window System, etc.

The graphical user interface may include a plurality of user interface elements, including indicators for displaying output of the graphical program and/or controls for specifying program input to the graphical program. Examples of user interface controls and indicators include charts, graphs, push buttons, knobs, numeric controls, text boxes, check boxes, list boxes, etc. The graphical user interface may also include any of various other types of user interface elements, such as menu bars, popup context menus, window close buttons, etc.

As the user interacts with the graphical user interface, various types of user interface events may be generated, as described above, and the graphical program may receive and respond to these events. The graphical program may be configured to receive and respond to only those events of interest. As used herein, responding to an event may include executing a portion of the graphical program, e.g., a portion of graphical source code, in response to the event being generated. In addition to user interface events, the graphical program may also receive and respond to other types of events, such as system events, timer events, events generated in response to data acquired from a device, etc.

In receiving a generated event, the graphical program may receive information or data specifying the event or associated with the event. The details of the information or data received may depend on the particular event. In one embodiment, the information may specify a source for the event, such as a user interface element with which the event is associated or from which the event is generated. For example, where the event is generated in response to the user interacting with a user interface control, the information may specify that control. As another example, where the event is generated in response to the user clicking the close button of a window, the information may specify that window. In one embodiment, the information may also specify an action or type for the event, such as "value changed", "get keyboard focus", "window resize", etc. In another embodiment, the element with which the event is associated and/or the action or type for the event may be inherent in the definition of the event. Thus, the information or data for the event may not explicitly specify these. The information or data for the event may also include other data, e.g., depending on the type of event.

The computer system 82 may include a memory medium(s) on which one or more computer programs or software components according to one embodiment of the present invention may be stored. For example, the memory medium may store the graphical program itself. Also, the memory medium may store a graphical programming development environment application used to create and/or execute such a graphical program. For example, the graphical programming development environment may provide an execution environment operable to generate and/or send various events to the graphical program. The memory medium may also store operating system software, as well as other software for operation of the computer system.

In one embodiment, the memory medium may store a graphical programming development environment which may be used for creating graphical programs operable to dynamically register one or more events. For example, the graphical programming development environment may provide a specialized event registration node for inclusion in a graphical program. In another embodiment, the graphical programming development environment may enable a graphical program to be created where the graphical program is operable to respond to one or more user-defined events. For example, the graphical programming development environment may provide one or more specialized nodes related to user-defined events for inclusion in a graphical program.

The term "memory medium" is intended to include an installation medium, e.g., a CD-ROM, floppy disks 104, or tape device; a computer system memory or random access memory such as DRAM, SRAM, EDO RAM, Rambus RAM, etc.; or a non-volatile memory such as a magnetic media, e.g., a hard drive, or optical storage. The memory medium may comprise other types of memory as well, or combinations thereof. In addition, the memory medium may be located in a first computer in which the programs are executed, or may be located in a second different computer which connects to the first computer over a network, such as the Internet. In the latter instance, the second computer may provide program instructions to the first computer for execution.

Figure 2:
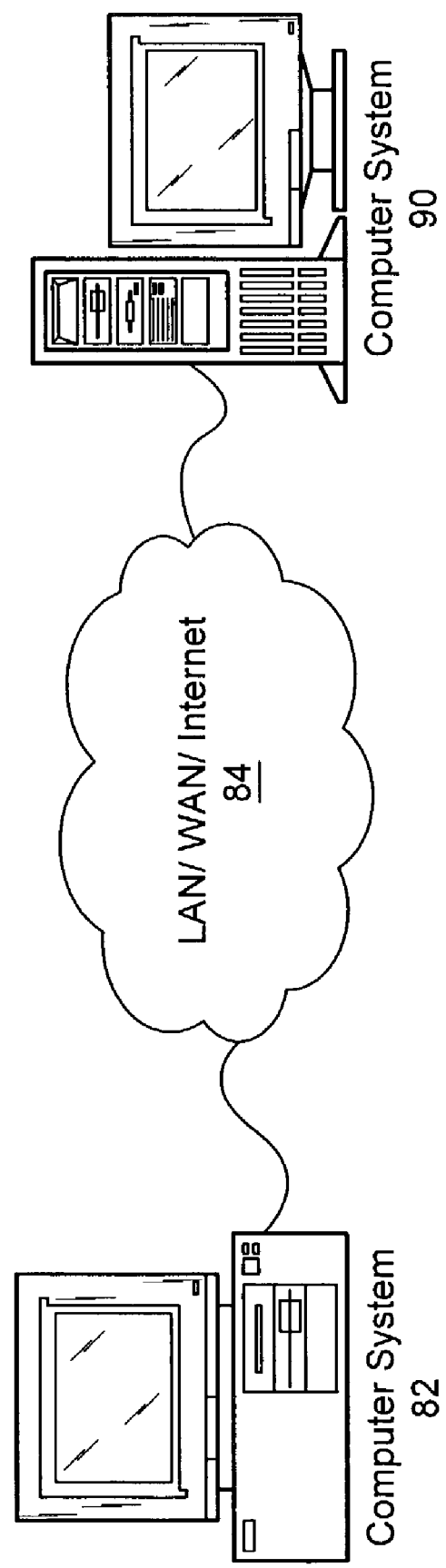
FIG. 2 illustrates a system including a first computer system that displays the graphical user interface of a graphical program and a second computer system that executes the block diagram of the graphical program.

FIG. 2—Computer Network

FIG. 2 illustrates a system including a first computer system 82 that displays the graphical user interface of a graphical program and a second computer system 90 that executes the block diagram of the graphical program. The computer system 82 may be connected through a network 84 to the second computer system 90. The computer systems 82 and 90 may each be any of various types, as desired. Also, the network 84 can also be any of various types, including a LAN (local area network), WAN (wide area network), the Internet, or an Intranet, among others.

Program output of the block diagram executing on the computer system 90 may be displayed in the graphical user interface on a display device of the computer system 82. Also, in response to receiving user input to the graphical user interface, the user input may be provided to the block diagram. The above-incorporated patent application titled "Graphical Programming System with Distributed Block Diagram Execution and Front Panel Display" describes one embodiment of a method enabling graphical program execution and GUI display of the graphical program output to be distributed across multiple computer systems.

The graphical program may be operable receive and respond to user interface events, similarly as described above. For example, a user interface event may be generated as a result of a user interacting with the graphical user interface on the computer system 82, and the block diagram executing on the computer system 90 may receive the generated event.

In another embodiment, the graphical user interface of the graphical program may be displayed on a display device of the computer system 82, and the block diagram may execute on a programmable hardware device. For example, the programmable hardware device may include configurable logic, such as an FPGA, or may include a processor and memory which may execute a real time operating system. The graphical program may be downloaded and executed on the programmable hardware device. For example, a graphical programming development environment with which the graphical program is associated may provide support for downloading a graphical program for execution on programmable hardware devices.

Figure 3:
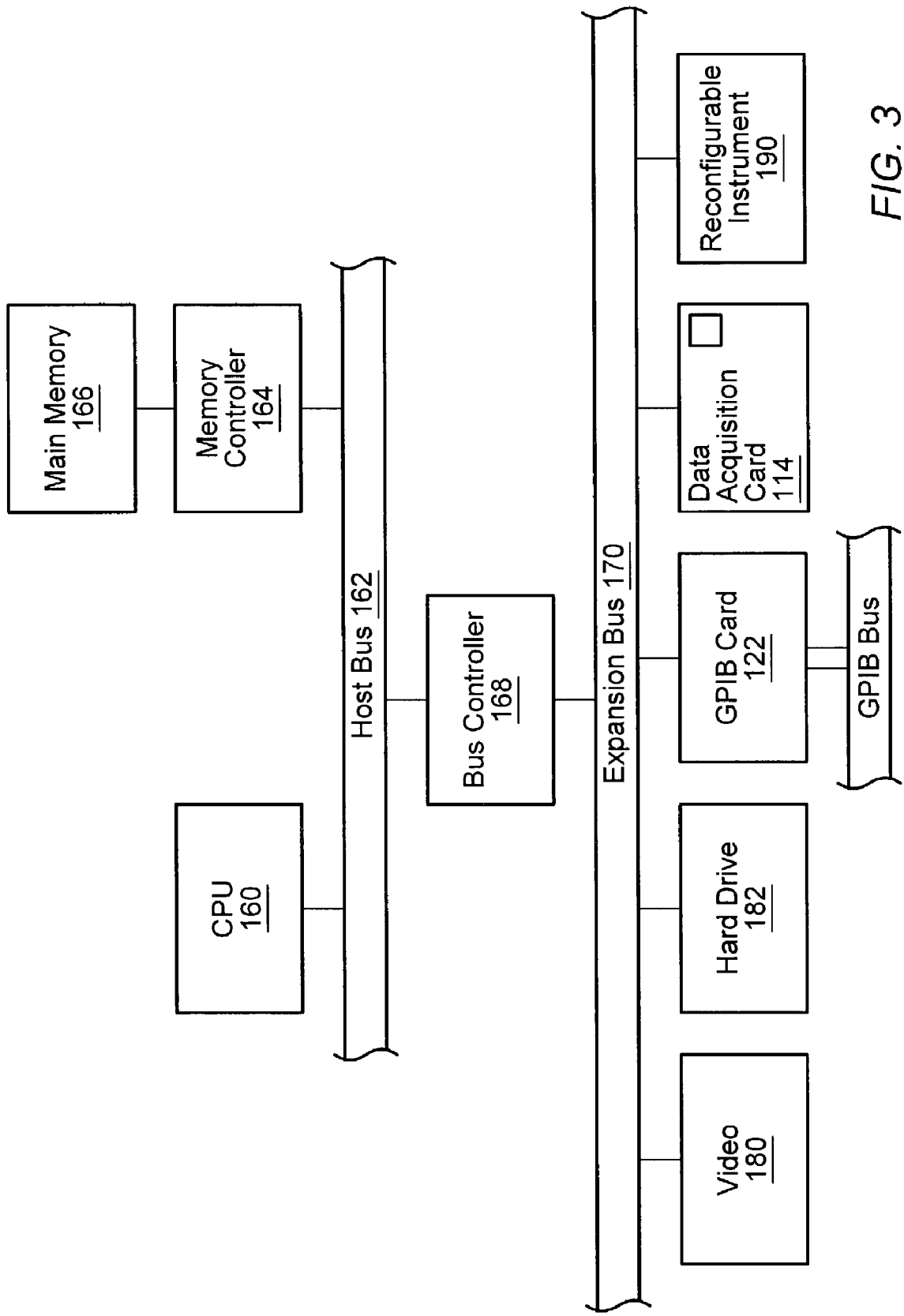
FIG. 3 is a block diagram of the computer systems of FIGS. 1 and 2.

FIG. 3—Computer System Block Diagram

FIG. 3 is a block diagram representing one embodiment of the computer system 82 and/or 90 illustrated in FIGS. 1 and 2. It is noted that any type of computer system configuration or architecture can be used as desired, and FIG. 3 illustrates a representative PC embodiment. It is also noted that the computer system may be a general purpose computer system, a computer implemented on a VXI card installed in a VXI chassis, a computer implemented on a PXI card installed in a PXI chassis, or other types of embodiments. Elements of a computer not necessary to understand the present description have been omitted for simplicity.

The computer 82 may include at least one central processing unit or CPU 160 which is coupled to a processor or host bus 162. The CPU 160 may be any of various types, including an x86 processor, e.g., a Pentium class, a PowerPC processor, a CPU from the SPARC family of RISC processors, as well as others. Main memory 166 may be coupled to the host bus 162 by means of memory controller 164. The main memory 166 may store a graphical program created according to the methods described herein. The main memory 166 may also store a graphical programming development environment such as described herein. The main memory 166 may also store operating system software, as well as other software for operation of the computer system.

The host bus 162 may be coupled to an expansion or input/output bus 170 by means of a bus controller 168 or bus bridge logic. The expansion bus 170 may be the PCI (Peripheral Component Interconnect) expansion bus, although other bus types can be used. The expansion bus 170 includes slots for various devices such as a data acquisition board 114 and a GPIB interface card 122 which provides a GPIB bus interface to a GPIB instrument. The computer 82 further comprises a video display subsystem 180 and hard drive 182 coupled to the expansion bus 170.

In one embodiment, a reconfigurable instrument 190 may also be connected to the computer 82. The reconfigurable instrument 190 may include programmable hardware such as described above for executing at least a portion of a graphical program. In various embodiments, the reconfigurable instrument 190 may be connected to the computer through means other than an expansion slot, e.g., the instrument or device may be connected via an IEEE 1394 bus, USB, or other type of port.

Figure 4:
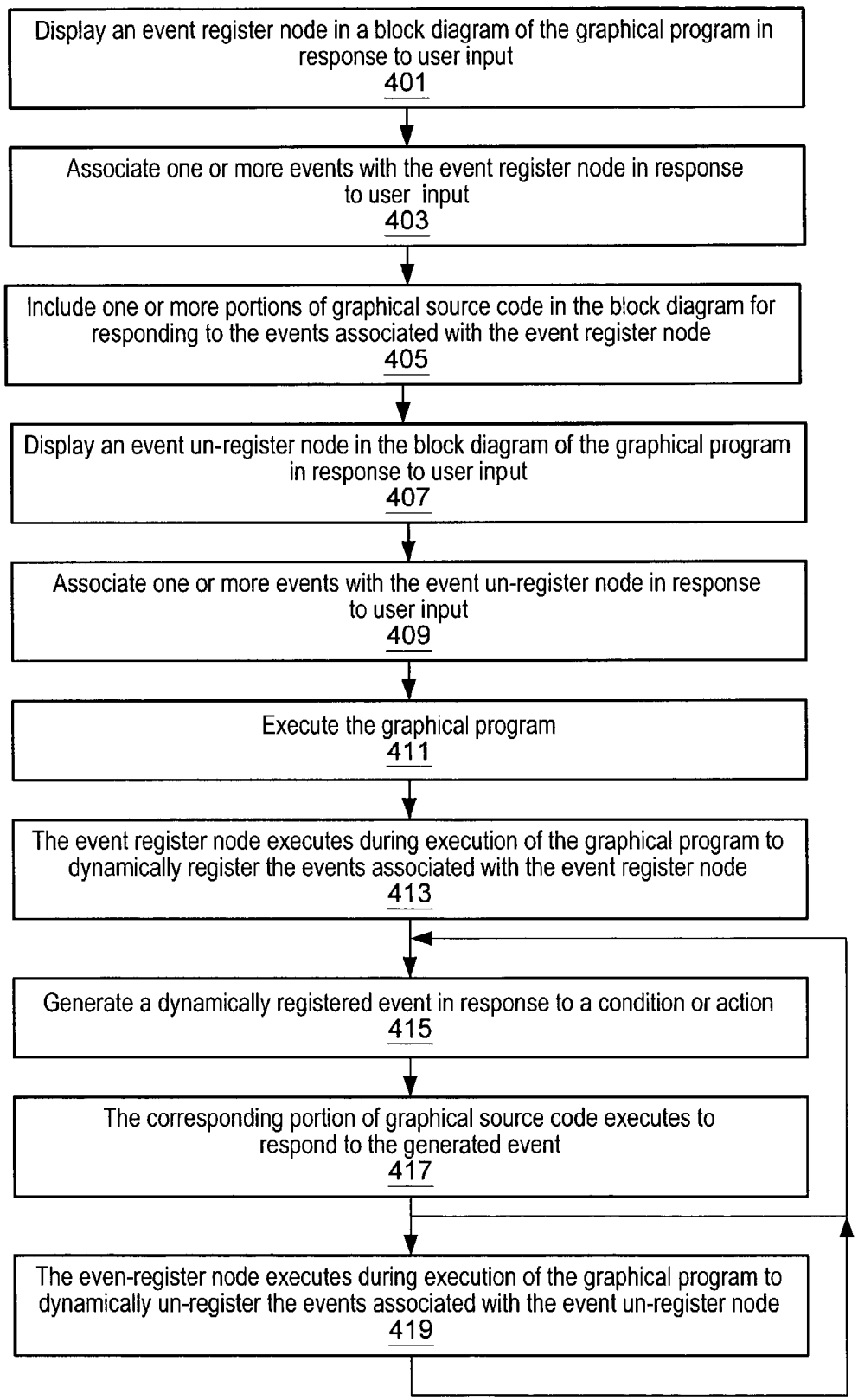
FIG. 4 is a flowchart diagram illustrating one embodiment of a method for creating a graphical program operable to dynamically register one or more events.

FIG. 4—Dynamically Registered Events

FIG. 4 is a flowchart diagram illustrating one embodiment of a method for creating a graphical program operable to dynamically register one or more events. It is noted that FIG. 4 illustrates a representative embodiment, and alternative embodiments are contemplated. Also, various elements may be combined, omitted, or performed in different orders.

In various embodiments, the graphical program may be created using any graphical programming development environment. Examples of graphical programming development environments for creating graphical programs include LabVIEW, DasyLab, and DiaDem from National Instruments; VEE from Agilent; WiT from Coreco; Vision Program Manager from PPT Vision; SoftWIRE from Measurement Computing; Simulink from the MathWorks; Sanscript from Northwoods Software; Khoros from Khoral Research; SnapMaster from HEM Data; and VisSim from Visual Solutions, among others.

Creating the graphical program may include creating a block diagram for the graphical program. The block diagram may be created in response to direct user input, e.g., the user may create the block diagram by placing or "dragging and dropping" icons or nodes on the display and interconnecting the nodes in a desired fashion. Alternatively, the block diagram may be programmatically, e.g., as described in the above-incorporated patent application titled, "System and Method for Programmatically Generating a Graphical Program in Response to Program Information". The plurality of nodes in the block diagram may be interconnected to visually indicate functionality of the graphical program. The block diagram may have one or more of data flow, control flow, and/or execution flow representations.

Creating the graphical program may also include creating a graphical user interface or front panel, e.g., in response to user input. The graphical user interface may be created in any of various ways, e.g., depending on the graphical programming development environment used. Creating the graphical user interface or front panel may comprise specifying various user interface elements. These user interface elements may include elements such as one or more windows or panels, menu bars, context menus, etc., as well as various user interface controls and indicators for receiving program input and/or displaying program output. Examples of user interface controls and indicators include charts, graphs, push buttons, knobs, numeric controls, text boxes, list boxes, check boxes, etc. For example, the LabVIEW graphical programming development environment, available from National Instruments Corporation, provides various user interface elements for inclusion in a graphical user interface. The kinds of user interface elements that are included in the graphical user interface may vary depending on the targeted platform of the graphical program. For example, if the graphical program is intended to execute on a personal digital assistant (PDA) or handheld computer, then the graphical user interface may include different types of elements than if the graphical program were intended to execute on a desktop computer system.

It is noted that the graphical user interface and the block diagram may be created separately or together, in various orders, or in an interleaved manner. In one embodiment, the user interface elements in the graphical user interface or front panel may be specified or created, and terminals corresponding to the user interface elements may appear in the block diagram in response. For example, when the user places user interface elements in the graphical user interface or front panel, corresponding terminals may appear in the block diagram as nodes that may be connected to other nodes in the block diagram, e.g., to provide input to and/or display output from other nodes in the block diagram. In another embodiment, the user interface elements may be created in response to the block diagram. For example, the user may create the block diagram, wherein the block diagram includes terminal icons or nodes that indicate respective user interface elements. The graphical user interface or front panel may then be automatically (or manually) created based on the terminal icons or nodes in the block diagram. As another example, the graphical user interface elements may be included in the block diagram.

Figure 5:
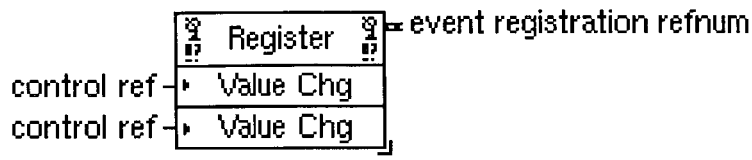
FIG. 5 illustrates an exemplary event registration node according to one embodiment.

Referring now to FIG. 4, in 401 an event registration node may be displayed in the block diagram of the graphical program in response to user input. For example, as described above, the user may drag and drop the event registration node onto the block diagram or otherwise select the event registration node for inclusion in the block diagram. FIG. 5 illustrates an exemplary event registration node according to one embodiment.

In 403, one or more events may be associated with the event registration node in response to user input. The event registration node may be operable to dynamically register the one or more events during execution of the graphical program. Dynamically registering the events may comprise enabling the graphical program to respond to the events. In other words, before the events are registered, the graphical program may simply ignore the events when they are generated, or the graphical program may not even receive the generated events. Once the events are dynamically registered, however, the graphical program may begin receiving and responding to the events as they are generated.

It may be desirable to dynamically register an event during execution of the graphical program for various reasons. For example, for a given event, it may only be necessary or desirable to receive and respond to the event if some condition becomes true during the course of executing the graphical program. Thus, the event may be dynamically registered, i.e., the event registration node may be configured to execute, when this condition becomes true or at some pre-determined point in the graphical program.

In various embodiments, the one or more events may be associated with the event registration node in any of various ways in 403. In one embodiment, associating the events with the event registration node may comprise connecting one or more inputs to one or more input terminals of the event registration node. For example, in one embodiment, for each event to be dynamically registered, an input representing the event may be connected to an input terminal of the event registration node. In another embodiment, one input representing a cluster or plurality of events may be connected to a single input terminal of the event registration node.

The information supplied by the input(s) to the input terminal(s) may depend on the particular embodiment, e.g., the particular way in which events are defined or represented in a given graphical programming development environment. In one embodiment, for each event, an input representing an element with which the event is associated may be connected to an input terminal of a field in the event registration node. For example, if the event is associated with a particular user interface control, a control reference input representing the user interface control may be connected to the input terminal of the field. The field may be configured with a selectable value representing an action or type for the event. For example, if the user desires to register an event to indicate when a user interface control's value has changed, the field may be set to a "Value Chg" action. In the exemplary event registration node illustration of FIG. 6, two control references have been connected to two fields in the event registration node, and each field has been set to a "Value Chg" action. The user may be able to vary the number of fields in the event registration node according to the number of events he desires to dynamically register.

In other embodiments, the one or more events may be associated with the event registration node in other ways. For example, the user may utilize a window or dialog box, may utilize a context menu for the event registration node, or may use other techniques to configure the event registration node with the one or more events to be dynamically registered.

In 405, one or more portions of graphical source code may be included in the block diagram for responding to the one or more events associated with the event registration node. A portion of graphical source code may include one or more nodes, programmatic structures (e.g., case structures, loop structures, etc.), or other elements. Thus, the user may display these nodes in the block diagram similarly as described above. The user may also interconnect the nodes (or other graphical program elements), e.g., to indicate data flow or control flow.

Each portion of graphical source code included in the block diagram in 405 may correspond to one of the events dynamically registered by the event registration node and may be intended to respond to the respective event. Thus, the portion of graphical source code may be executed when the corresponding event is generated, as described further below. The portion of graphical source code may be executable to perform any desired process or action in response to the corresponding event. The interconnected nodes in the portion of graphical source code may visually indicate this process or action.

A portion of graphical source code may also correspond to more than one event. For example, if two separate events need to be handled identically, then a single portion of graphical source code may be associated with both events. Also, as described below, a portion of graphical source code may also respond to one or more non-dynamically registered, e.g., statically registered, events.

In various embodiments, a portion of graphical source code may be associated with an event in any of various ways and may be related to other nodes in the block diagram in any of various ways. In one embodiment, a reference to a portion of graphical source code may be supplied to an input terminal of the event registration node to specify which portion of graphical source code should respond to the event. In another embodiment, each portion of graphical source code may include information specifying which event(s) the portion of graphical source code corresponds to.

In one embodiment, a portion of graphical source code for responding to an event may be encapsulated within a sub-program node. A sub-program node may be a node that is included in the block diagram, but may represent a separate block diagram. Thus, graphical source code to respond to events may be encapsulated "within" or "behind" respective sub-program nodes, e.g., in a hierarchical fashion.

In another embodiment, an event structure node may be included in the block diagram, wherein the event structure node includes one or more sub-diagrams. Each sub-diagram may include graphical source code for responding to one or more events. Each "sub-diagram" may comprise a bounded area within the event structure node in which graphical source code may be placed. Thus, 405 may comprise creating graphical source code within various sub-diagrams of the event structure node. In one embodiment, only one sub-diagram of the event structure node may be visible at a time, and the user may toggle through the various sub-diagrams as desired. In another embodiment, multiple sub-diagrams may be visible simultaneously. One embodiment of an event structure node is discussed in detail below.

Just as it may be desirable to dynamically register an event, it may also be desirable to dynamically un-register an event at some point during execution of the graphical program. The event to be un-registered may be an event that was previously registered dynamically or may be a non-dynamically registered event, such as an event statically registered by specifying the event at edit time via a dialog, as described below.

Figure 6:
FIG. 6 illustrates an exemplary event un-registration node according to one embodiment.

Thus, in one embodiment of the method, in 407, an event un-registration node may be displayed in the block diagram of the graphical program in response to user input. FIG. 6 illustrates an exemplary event un-registration node according to one embodiment. In 409, one or more events may be associated with the event un-registration node in response to user input. For example, in one embodiment, the events may be associated with the event un-registration node by connecting one or more inputs representing the events to one or more input terminals of the event un-registration node, as shown in FIG. 6.

The event un-registration node may be operable to dynamically un-register the events associated with the event un-registration node. Dynamically un-registering the events may comprise making the graphical program stop responding to the events as the events are generated. For example, for a given event, the portion of graphical source code that previously executed in response to the event being generated may no longer execute when the event is generated.

It is noted that 401-407 may be performed in various orders or in an interleaved fashion as the graphical program is created. The user may also be able to include more than one event registration node or event un-registration node in the graphical program, e.g., to dynamically register or un-register events at different points during execution of the program. Also, in addition to the nodes discussed above, the user would also typically include various other nodes in the graphical program to implement the desired functionality of the graphical program.

Once the graphical program has been created, the graphical program may be executed, as indicated in 411.

In 413, the event registration node may execute during execution of the graphical program. For example, the user may have positioned the event registration node within the block diagram and interconnected the event registration node with other nodes in the block diagram such that the event registration node executes when some condition becomes true during the course of executing the graphical program or executes at a pre-determined point in the graphical program. As described above, the event registration node may execute to dynamically register the events associated with the event registration node.

In 415, an event dynamically registered by the event registration node may be generated. The event may be generated in response to ay of various conditions or actions, e.g., depending on the type of event. For example, for a user interface event, the event may be generated in response to user input to the graphical user interface of the graphical program. As another example, for a system event, the event may be generated in response to a change in the state of the computer system.

In 417, the portion of graphical source code that corresponds to the event generated in 415 executes in response to the generated event. As described above, the portion of graphical source code may be operable to respond to or handle the generated event by performing any of various processes or actions. As indicated by the flowchart arrow returning to 415, the process of generating and responding to events may be performed multiple times.

The functionality of receiving the generated events and invoking the corresponding portions of graphical source code may be implemented in any way, e.g., depending on the particular graphical programming development environment used to create the graphical program. For example, in one embodiment, the graphical program may execute under the management of an execution subsystem of the graphical programming development environment, and the execution subsystem may intercept events as they are generated and may invoke the appropriate portions of the graphical program for registered events. In one embodiment, a mapping may be performed between events generated by the computer system's native user interface system and events defined or supported by the graphical programming development environment.

In another embodiment, the graphical program may not execute under an execution subsystem of the graphical programming development environment, but may execute independently. In this case, for example, when executable code for the graphical program is created, code operable to intercept the events may be linked in with the graphical program.

In one embodiment, in addition to the graphical program responding to an event, the event may be further processed. For example, depending on the type of event, the user interface system or operating system may process the event. However, in some cases, the graphical program may filter the event, e.g., by changing event data for the event. This may affect later processing of the event. For example, the graphical program may filter keystrokes by changing lowercase keystroke event data to uppercase event data. Also, in some cases, the graphical program may discard an event altogether.

In 419, the event un-registration node may execute during execution of the graphical program. For example, the user may have positioned the event un-registration node within the block diagram and interconnected the event un-registration node with other nodes in the block diagram such that the event un-registration node executes when some condition becomes true during the course of executing the graphical program or executes at a pre-determined point in the graphical program. As described above, the event un-registration node may execute to dynamically un-register the events associated with the event un-registration node. As indicated by the flowchart arrow returning to 415, events that have not been un-registered may still be generated and may be processed by the graphical program.

As noted above, various alternative embodiments are contemplated for dynamically registering events. For example, although the method is described above in terms of a single node being operable to dynamically register events, in another embodiment a combination of nodes or other graphical program elements may be utilized to dynamically register events. Similarly, a combination of nodes or other graphical program elements may be utilized to dynamically un-register events.

Statically Registered Events

As noted above, in one embodiment, in addition to dynamically registered events, one or more events may be statically registered. For example, the user may specify one or more events to be automatically registered when the graphical program begins execution, e.g., by utilizing a dialog box or window at edit-time to specify the events. Thus, it may not be necessary to include graphical source code for registering these events in the block diagram of the graphical program.

The user may specify desired events that the graphical program should receive and respond to by interacting with a graphical user interface dialog or wizard. For example, the dialog may display a list of user interface elements and event actions associated with those elements, allowing the user to select the elements and actions of interest. In response to the user's selections, a graphical source code "placeholder" portion may be automatically included in the block diagram and associated with each selected event, e.g., a sub-program node or a sub-diagram of an event structure node may be created for and associated with each selected event. The user may then fill out the placeholder portions with graphical source code, e.g., by including a plurality of interconnected nodes in each sub-program or sub-diagram, such that the graphical source code is operable to respond to the respective event in the desired manner. In some cases, the user may want the same portion of graphical source code to respond to multiple events. Thus, the dialog may enable the user to group events together as desired. For example, a single sub-diagram of an event structure node may be associated with two or more events.

Figure 7:
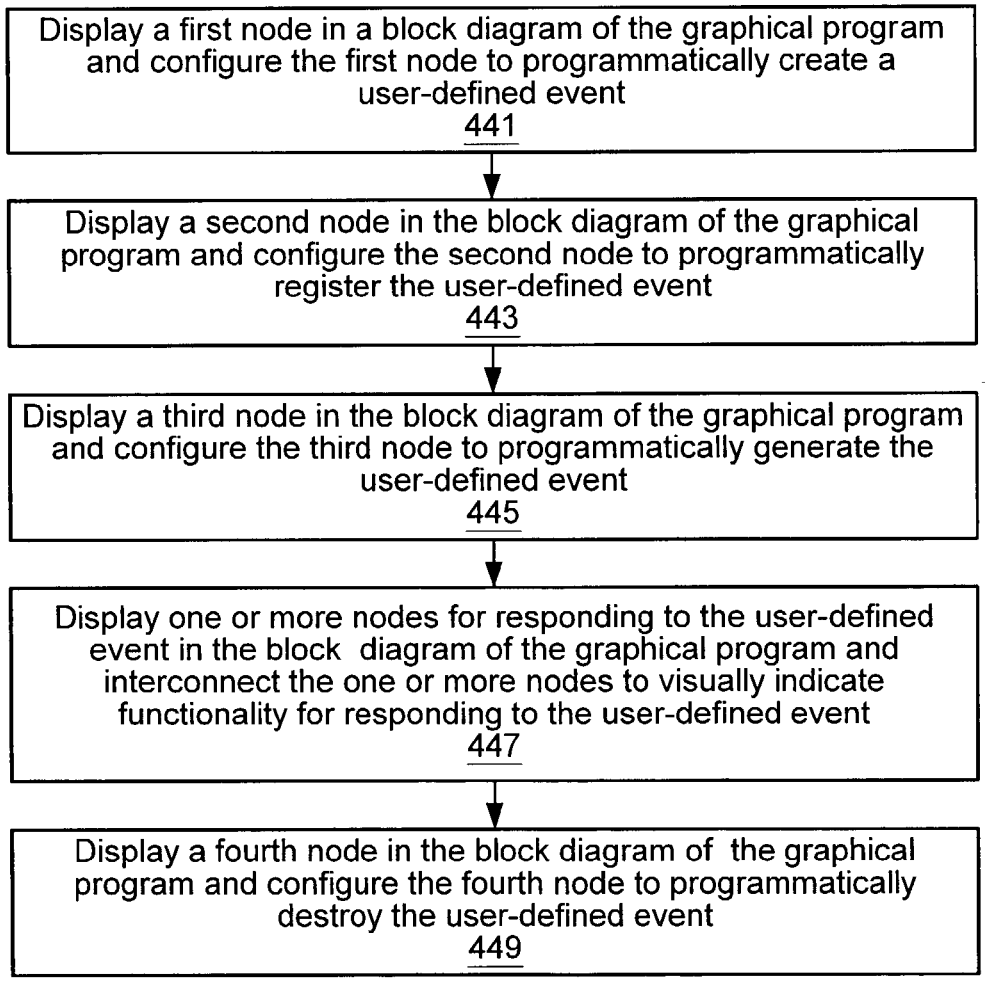
FIG. 7 is a flowchart diagram illustrating one embodiment of a method for creating a graphical program operable to create and respond to one or more user-defined events.

FIG. 7—User-Defined Events

In some situations, the user may desire to define custom, i.e., user-defined, events for use in a graphical program. For example, the user may desire the graphical program to respond to certain situations for which no pre-defined event is generated. FIG. 7 is a flowchart diagram illustrating one embodiment of a method for creating a graphical program operable to create and respond to one or more user-defined events. It is noted that FIG. 7 illustrates a representative embodiment, and alternative embodiments are contemplated. Also, various elements may be combined, omitted, or performed in different orders.

In 441, a first node may be displayed in a block diagram of the graphical program. For example, as described above, the user may drag and drop the first node onto the block diagram or otherwise select the first node for inclusion in the block diagram. The first node may then be configured to programmatically create or define a user-defined event. As used herein, creating the user-defined event may comprise defining the user-defined event so that the user-defined event can then be generated, e.g., by creating a reference that can be passed to another node to generate or fire the event, as described below. The first node may be operable to programmatically create the user-defined event when the first node is executed during execution of the graphical program.

In various embodiments, the first node may be configured to programmatically create the user-defined event in any of various ways. In one embodiment, configuring the first node may comprise connecting one or more inputs to one or more input terminals of the first node in response to user input. For example, an input may specify a name for the user-defined event to be created. An input may also specify one or more data fields for the first user-defined event. For example, when the user-defined event is subsequently generated, values may be specified for the data fields. These values may then be used, for example, to affect the response to the generated event.

The first node may also have an output terminal for providing a reference to the created user-defined event. This reference may be used by other nodes in the block diagram of the graphical program, as described below. FIG. 8 illustrates an example of a first node according to one embodiment, also referred to as a Create User Event node.

In 443, a second node may be displayed in the block diagram of the graphical program. The second node may then be configured to programmatically or dynamically register the user-defined event. For example, the reference to the programmatically created user-defined event outputted by the first node may be connected to an input terminal of the second node. In one embodiment, the second node may be an event registration node such as described above with reference to FIG. 4. In an alternative embodiment, a single node may be used to both create and register the user-defined event.

In one embodiment, a reference to a portion of graphical source code may be supplied to an input terminal of the second node (or the first node) to specify which portion of graphical source code should respond to the user-defined event. In another embodiment, each portion of graphical source code may include information specifying which event(s) the portion of graphical source code corresponds to.

In 445, a third node may be displayed in the block diagram of the graphical program. The third node may then be configured to programmatically generate or fire the user-defined event. For example, the reference to the programmatically created user-defined event outputted by the first node may be connected to an input terminal of the third node. Thus, when the third node is executed during execution of the graphical program, the third node may be operable to generate or fire the user-defined event. In response to the generated event, a portion of graphical source code for responding to the user-defined event may execute, as described below. Thus, in contrast to pre-defined events which are typically generated in response to pre-defined actions or conditions determined externally to the graphical program, the generation of a user-defined event may be determined by the graphical program itself. The graphical program includes graphical source code to explicitly generate the user-defined event.

The third node may also include one or more input terminals for connecting data values for the generated event. The specified data values may be associated with the generated event and may be used by the graphical source code which responds to the user-defined event. FIG. 9 illustrates an example of a third node according to one embodiment, also referred to as a Fire User Event node.

In 447, one or more nodes for responding to the user-defined event may be displayed in the block diagram of the graphical program. The user may interconnect the one or more nodes, e.g., to indicate data flow or control flow. The interconnected nodes may visually indicate functionality for responding to the user-defined event.

The one or more nodes (also referred to as a portion of graphical source code) may be executed in response to the user-defined event being generated during execution of the graphical program, e.g., in response to the third node executing to programmatically generate the user-defined event. The portion of graphical source code may be operable to perform any desired process or action to respond to the user-defined event.

Similarly as described above with reference to FIG. 4, the portion of graphical source code for responding to the user-defined event may be associated with the user-defined event in any of various ways and may be related to other nodes in the block diagram in any of various ways. In one embodiment, the portion of graphical source code may be encapsulated within a sub-program node. In another embodiment, the portion of graphical source code may be included in a sub-diagram of an event-structure node, or may be otherwise included in the graphical program.

It may be desirable for the graphical program to stop responding to the user-defined event at some point during execution of the graphical program. Thus, in 449, a fourth node may be displayed in the block diagram of the graphical program. The fourth node may be configured to programmatically destroy the user-defined event. For example, the reference to the programmatically created user-defined event outputted by the first node may be connected to an input terminal of the fourth node. Thus, when the fourth node is executed during execution of the graphical program, the fourth node may be operable to destroy the user-defined event. Programmatically destroying the user-defined event may comprise making the graphical program stop responding to the user-define event. The reference to the user-defined event outputted by the first node may also become invalid after the user-defined event is destroyed.

FIG. 10 illustrates an example of a fourth node according to one embodiment, also referred to as a Destroy User Event node. In another embodiment, the event un-registration node described above may be used to destroy or un-register the user-defined event.

As noted above, various alternative embodiments are contemplated for creating a graphical program operable to utilize user-defined events. For example, although the method is described above in terms of specific nodes for creating a user-defined event, generating the user-defined event, destroying the user-defined event, etc., in various embodiments, graphical source code for accomplishing this functionality may be structured in any of various ways and may include any number or type of graphical program elements. Also, in one embodiment, user-defined events may be statically defined at edit-time and/or automatically registered when the graphical program begins execution, so that code for accomplishing this functionality need not appear in the graphical program.

Figure 11:
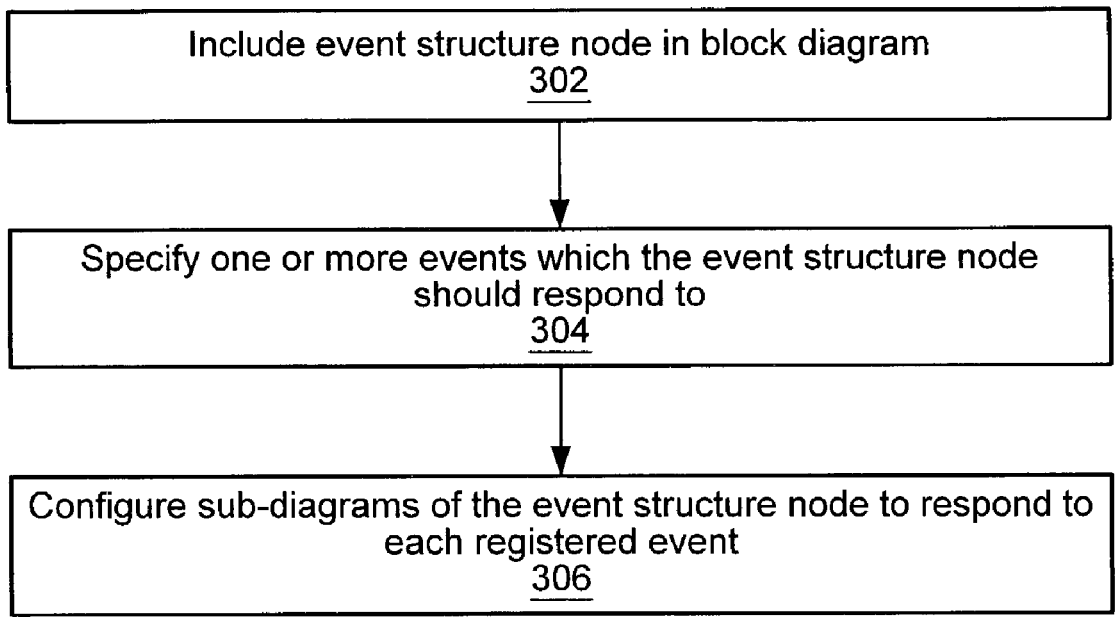
FIG. 11 is a flowchart diagram illustrating one specific embodiment in which an event structure node is utilized to receive and respond to events in a graphical program.

FIG. 11—Utilizing an Event Structure Node

FIG. 11 is a flowchart diagram illustrating one specific embodiment in which an event structure node is utilized to receive and respond to events in a graphical program. In 302, an event structure node may be included in the block diagram of the graphical program in response to user input. For example, the user may drag and drop the event structure node into the block diagram from a palette, may select the event structure node using a menu command, or may cause the event structure node to be included in the block diagram in any of various other ways. An exemplary event structure node is described below.

In 304, one or more events that the event structure node should respond to may be specified. The events may be specified using a graphical user interface dialog and/or by connecting one or more event registration nodes to the event structure node.

The event structure node may be configured to have one or more sub-diagrams, wherein each sub-diagram corresponds to one or more events. In 306, each of these sub-diagrams may be configured. For each sub-diagram, the user may include a portion of graphical source code in the sub-diagram, such that the portion of graphical source code is executable to respond to the respective event(s) as desired.

The following describes one particular embodiment of an event structure node and how such an event structure node may be used in a block diagram. It is noted that the following description includes details for exemplary purposes only and is not intended to limit the scope of the methods described above.

Figure 12:
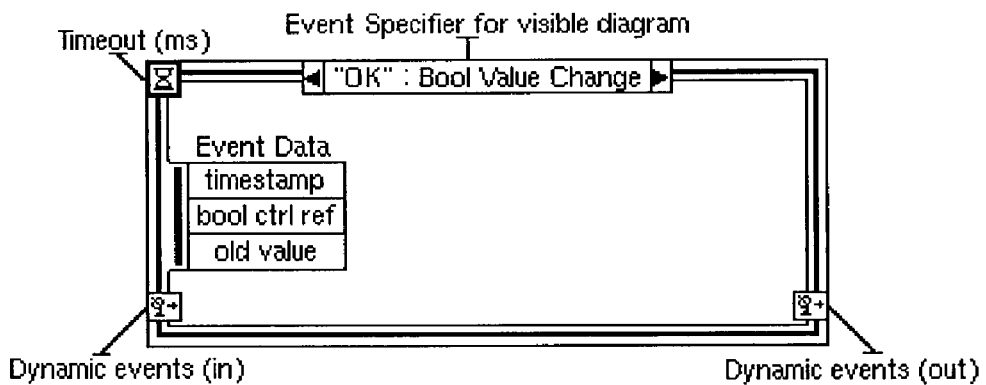
FIG. 12 illustrates an exemplary event structure node available for inclusion in the block diagram of a graphical program.

FIG. 12 illustrates an exemplary event structure node available for inclusion in the block diagram of a graphical program. The event structure node may comprise multiple sub-diagrams, each associated with one or more registered events. On each sub-diagram, the user may include or insert a portion of graphical source code (e.g., a set of interconnected nodes) operable to respond to the respective event(s) to which the sub-diagram corresponds. In one embodiment, only one sub-diagram of the event structure node is visible at a time. When editing or viewing the block diagram, the user may change the displayed sub-diagram using the arrows shown at the top of the event structure node.

When a registered event is generated during execution of the graphical program, the event structure node may execute the appropriate sub-diagram for the event that occurred. This sub-diagram may have access to data for that event via terminals on the left hand side of the interior of the event structure node. Each sub-diagram may have different event data, depending on which event(s) are handled by that sub-diagram.

Figure 13:
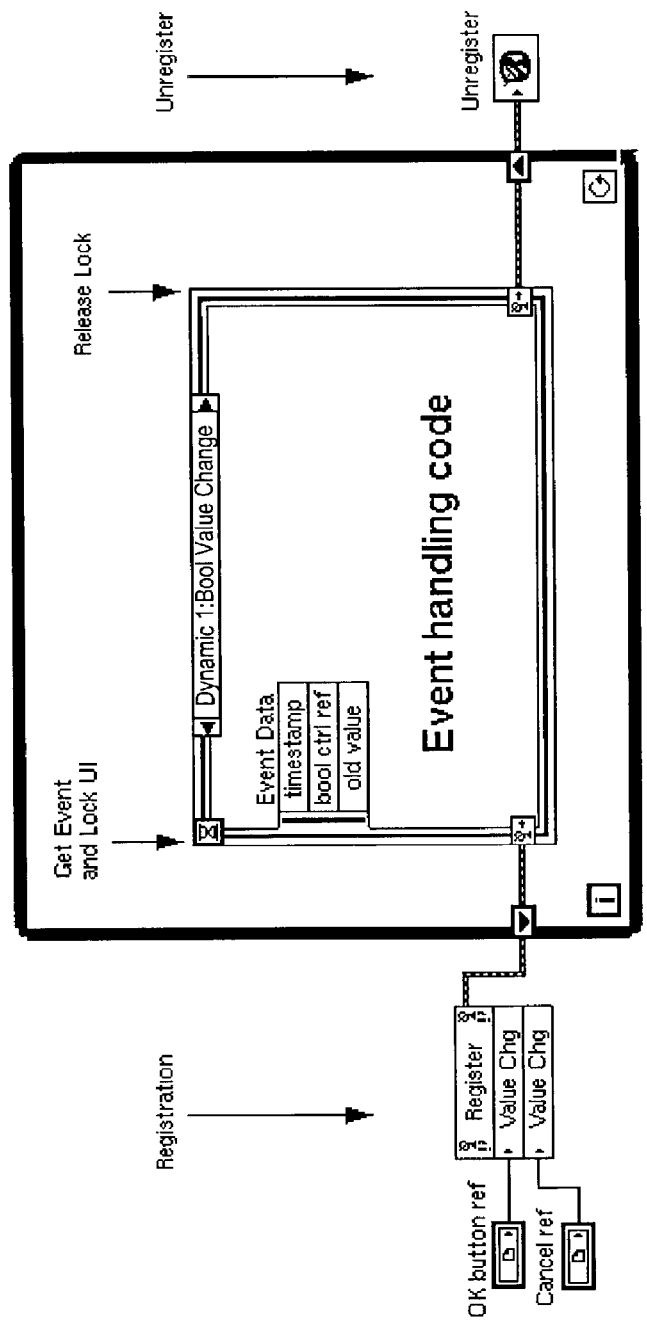
FIG. 13 illustrates an exemplary block diagram that uses the event structure node of FIG. 12.

FIG. 13 illustrates an exemplary block diagram that uses the event structure node. The block diagram of FIG. 13 also illustrates an event registration node (see FIG. 5) operable to dynamically register two events. In this case, a "value change" event is being registered for an OK button and a cancel button, respectively. Thus, when registering an event, a combination of a source, such as a particular user interface element (e.g., a window or control), and a specific action, condition, or event type associated with that element (e.g., window resize, control value change, etc.) may be specified.

The event registration node may be a growable node (i.e., with a variable number of inputs) that accepts input references to one or more user interface elements. Each user interface element input reference may have a "Select Event" pop-up context menu to select which event or action to register for that element. Multiple events or actions can be registered for the same user interface elements, or for multiple user interface elements, using only one event registration node. The output of the event registration node may be a composite "registered event" reference that gives a unique ID to the registration. This ID may be used internally to keep track of who needs to be notified of an event when it occurs. The registered event reference can be wired to the 'dynamic events' input of the event structure node, to an event un-registration node, or to the input of another event registration node.

In FIG. 13, the event structure node is enclosed in a loop structure. The following may be repeatedly performed in the loop (the event structure node integrates the functionality of these steps):

Get Event/Lock User Interface: Sleep, waiting for a registered event and receive information describing an event when one is generated. Non-registered events may be handled automatically, with no effect on the program. In one embodiment, when a registered user interface event is generated, the user interface processing may be locked and low-level event processing may be blocked until the event is handled and the lock released. Raw user interface events may be only minimally processed and then queued until the lock is released. Locking the user interface processing may be necessary for a multi-threaded dataflow program. If the graphical program is not multi-threaded, this locking behavior may not be necessary.

Respond to Event: Execute the graphical source code corresponding to the event.

Figure 14:
FIG. 14 illustrates an exemplary "Unlock UI" node.

Release Lock: Release the user interface lock and resume processing low level and non-registered events. Thus, after the sub-diagram associated with an event executes, the user interface processing may be unlocked and queued events may be processed as normal until another registered event occurs. An optional "Unlock UI" node (see FIG. 14) can be placed on an event handling sub-diagram to release the lock early before the sub-diagram completes. Also, each sub-diagram may be individually configured to lock or not lock user interface processing by default. This may be configured, for example, using a popup context menu.

FIG. 13 also illustrates an event un-registration node (see FIG. 6) operable to dynamically un-register one or more events. Any events pending in the associated event queue may be discarded. After an event is un-registered, default event-handling for that event may be resumed by the system.

The block diagram of FIG. 13 utilizes an event registration node to dynamically register events. However, events may also be statically registered using a dialog. An exemplary dialog for this purpose is described below.

The event structure node shown in FIG. 12 has several special terminals on its border:

timeout (ms): The number of milliseconds to sleep waiting on an event to occur. An input of −1 (the default) means to wait forever. If the timeout expires before an event occurs, a "Timeout" event may be generated.

dynamic events: A pair of matching terminals on the left and right borders of the event structure node. The left-hand input terminal may accept either an event registration reference, or a user interface element reference, or a cluster of these. The right-hand terminal is in place to the left-hand one, and does not need to be wired from the inside of the diagram.

event data node: A special node attached to the inside left border of each event handling sub-diagram. The data provided by this node may be different on each sub-diagram, depending on which event(s) that sub-diagram is configured to handle. In one embodiment, if a single sub-diagram is configured to handle multiple events, only the data which is common to all handled event types may be available. However, some event data may be considered "crucial," and the user may not be allowed to configure a sub-diagram to handle multiple events that are incompatible because crucial data would be omitted. Common event data may include: a reference to the source or user interface element with which the event is associated, a time stamp indicating when the event occurred, etc.

The sub-diagram for some events may filter the events. For example, the handler sub-diagram for an event may modify the event data before the event is further processed by the user interface, or may discard the event entirely. In one embodiment, this may be accomplished by including an additional "event data feedback" node in the event-handling sub-diagram. This node can be used to replace the event data with new data. Also, a "discard event" Boolean field may be available which will cause the event to be discarded entirely if true. Filtering events in this way may allow more freedom in controlling how the user interface behaves. For example, the graphical program could respond to a "window close" event by bringing up a confirmation dialog, discarding the event if the user does not confirm the action. As another example, the graphical program could respond to a "key press" event by changing the key data to an uppercase letter, thus forcing all characters typed into a string control to be uppercase, or the graphical program could filter out unwanted characters.

Figure 15:
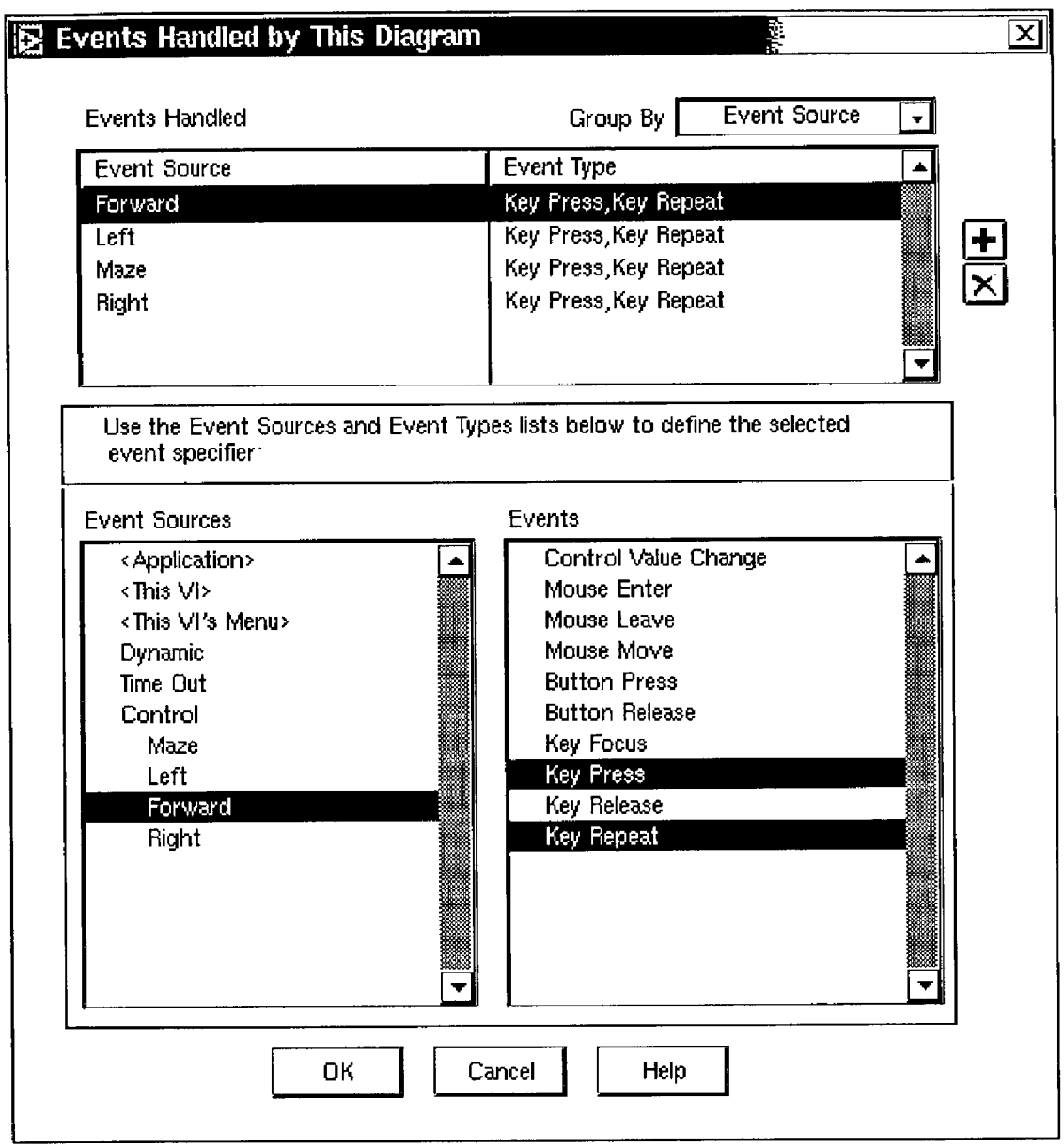
FIG. 15 illustrates an exemplary event configuration dialog.

FIG. 15 illustrates an exemplary event configuration dialog. The particular set of events handled by a particular event structure node sub-diagram may be configured using this event configuration dialog. For example, the dialog may be accessed using a pop-up menu item from the sub-diagram. (A similar dialog may be used to automatically configure an event registration node with the appropriate inputs to dynamically register the desired events.)

The top pane, "Events Handled", lists <event source, event type> pairs handled by this sub-diagram. When editing complex sets of events, the "Group By" ring allows the user to group events together in the list by event source, event type, or ungrouped. If the user groups by event source, each event source (for example, each individual user interface element) appears on a row by itself, with all corresponding event types separated by commas, as shown. Grouping by event type does the converse—each event type is on a separate row, with the corresponding sources separated by commas. Selecting "Ungrouped" causes each pair to be listed on a row by itself. This grouping is merely a way of controlling the way the information is viewed. The set of events being handled does not change, but it is easier to verify that the intended set of events is being handled. Clicking on the "+" and "X" buttons adds or deletes a row from the top Events Handled pane.

When the user clicks on a row in the "Events Handled" listbox pane, the twin "Event Sources" and "Events" panes below update to highlight the selected items. Selecting or deselecting items in these panes causes the top "Events Handled" pane to update accordingly. In addition to each user interface control on the front panel, the event sources that can be selected include special sources such as <This Application>, <This VI>, <This VI's Menu>, a Time Out event source, and a Dynamic event source.

The Dynamic event source refers to events specified via the "dynamic refnum" input to the event structure node. The Dynamic source can be collapsed and expanded in the manner of a tree control to show individual dynamically registered controls/events. If an event registration reference is wired, the names listed may be derived from the individual events registered upstream in an event registration node. If a cluster of references is wired, the cluster field names will serve the same purpose. These dynamic sub-field names can be selected individually and associated with different event handling sub-diagrams. When using the dialog to configure an event registration node, all events are dynamic. In this case, the object references wired to the node are listed as sources.

Selecting a new event source in the left pane will cause the right pane to update to list the events or actions available from that source. If multiple sources are selected (in group by event type mode), the events list is culled to show only events which exist for all selected sources.

The Help button at the bottom brings up context-sensitive help for the dialog, which describes the purpose of each pane and details about the currently selected event source and type. The dialog may prevent the user from grouping together multiple event sources/types if the events are incompatible, that is, would yield no useful common event data. Likewise, it may be illegal to group "filter events" which do not have identical feedback data.

An alternative presentation of this dialog would be to use a tree control, with event sources as branches and event types as leaves.

In one embodiment, events may be configured from the context of the front panel or graphical user interface of the graphical program. For example, there may be an edit-time pop-up item available on each front panel user interface control to edit the events of interest for that control. A dialog may come up containing a simple multi-selection listbox of the events associated with that control (like the lower-right pane of the general dialog described above). Adding new events to the list may automatically populate the event structure with empty sub-diagrams, one per event. Removing events may delete the events from the event structure and the associated sub-diagram, if it is the only event handled by that sub-diagram, after asking user confirmation.

In one embodiment, the same event can be registered multiple times. For example, there may be multiple event structure nodes, each having a sub-diagram corresponding to the event. When the event is generated, each of these sub-diagrams may be executed.

Exemplary Events and Uses of Events

Figure 16:
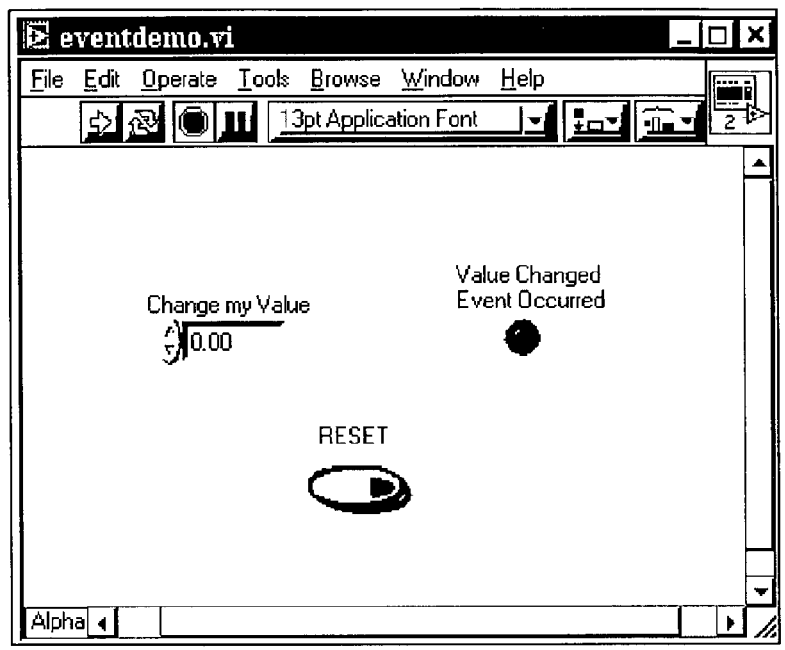
FIGS. 16-18 illustrate an exemplary LabVIEW graphical program that uses one embodiment of an event structure node.
Figure 17:
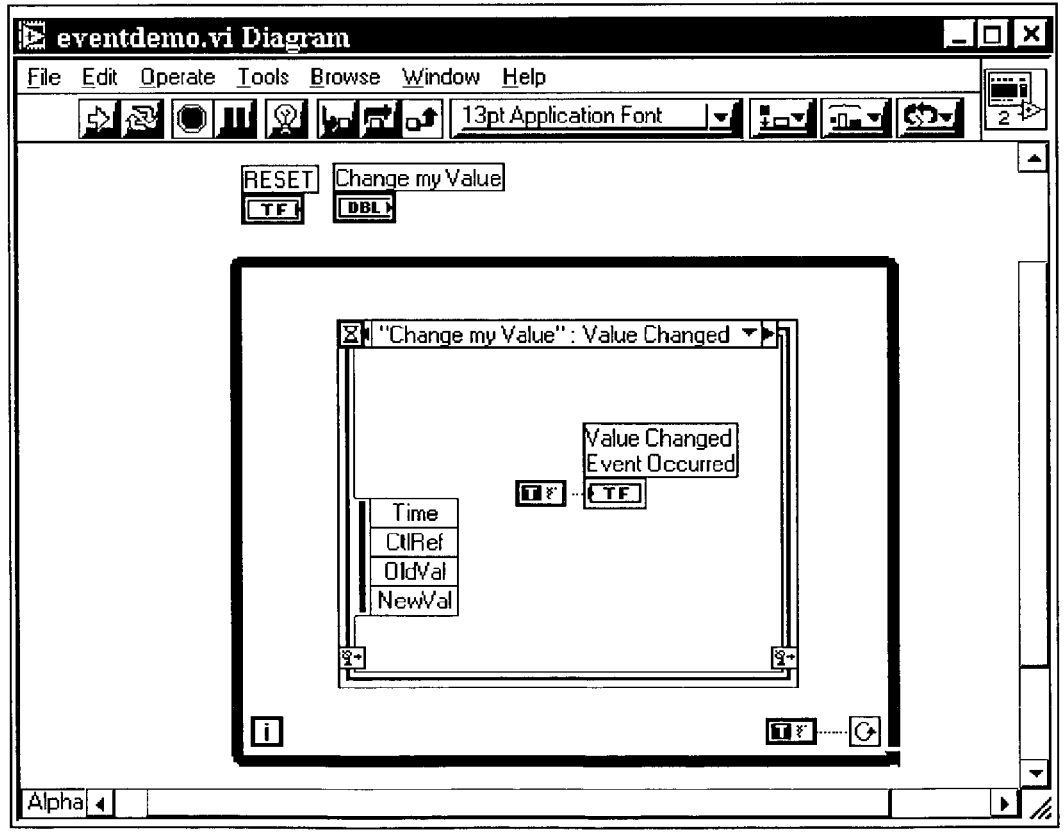
Figure 18:
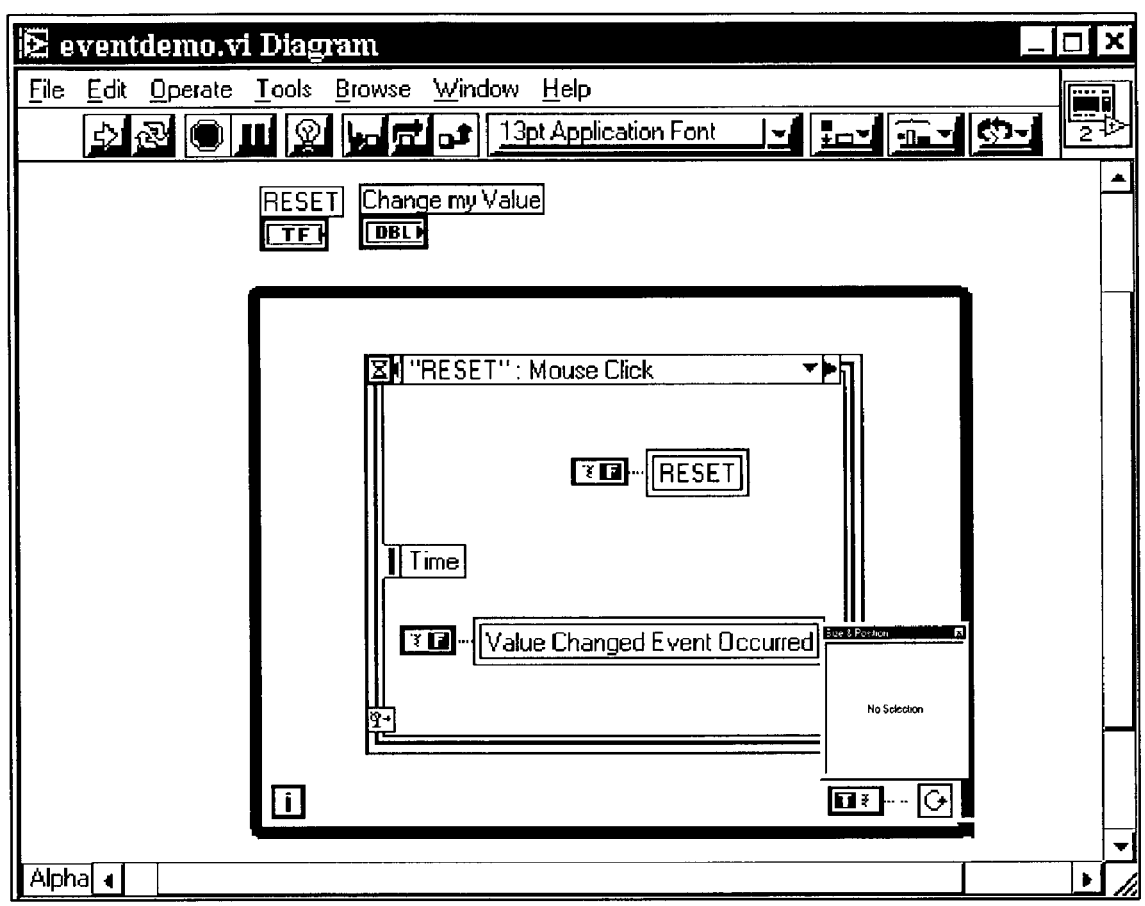

A graphical program may make use of user interface events in many different ways. The following list illustrates some exemplary uses:

to monitor button presses
to filter numeric input (e.g., so that only even numbers may be input)
to filter string input (e.g., to convert all characters to upper case)
to be notified of a the graphical program terminating in order to do some cleanup, put hardware in a known state, etc.
to disallow closing a window by clicking the close button
to handle resizing of fonts, placement/size of controls when window is resized
to make the graphical program sleep (or do less processing) when window is minimized
to construct one's own hot-keys (with keypress events)
to set up one's own help-window for specialized controls (with mouse focus events)
to implement an image map using a cosmetic or other image The following represents a partial list of possible user interface event types, as well as data that the graphical program may receive when the respective events occur:
 Value Changed: Control Reference, Time Stamp, Event Type, Previous Value, New Value
 Panel Closing: Panel Reference, Time Stamp, Event Type
 Panel Closed: Panel Reference, Time Stamp, Event Type
 Application Exiting: Application Reference, Time Stamp, Event Type
 Mouse Click: Control Reference, Time Stamp, Mouse Local Coordinates, Button Pressed, Modifiers
 Key Press: Control Reference, Time Stamp, Key, Modifiers
 Mouse Up: VI Reference, Time Stamp, Button Released
 Mouse Down: VI Reference, Time Stamp, Button Pressed
 Key Up: VI Reference, Time Stamp, Key Released
 Key Down: VI Reference, Time Stamp, Key Pressed Many other events may be supported, such as Mouse Focus (Mouse Enter/Leave), Key Focus(Gained/Lost), Execution Terminating, Panel Resized, etc. In addition, some events may be supported that are particular to a certain type of user interface element or control. The following is a partial list of possible user interface events related to user interface controls provided by the LabVIEW graphical programming development environment:

Cursor
　Plot changed
　Position Changed
　Point Index Changed
Scale
　Range Changed (minimum/maximum)
　Marker Spacing Changed
　Fit Changed
Color Box
　Value Change
　Color Area Size Change (width/height)
Boolean
　Value Change
Path
　Value Change
　Browse Dialog Open
List Box
　Row Number at top Changed
　Item Double-clicked
　Value Change
　Selection Added
　Selection Removed
Table
　Value Change
　Selection Change
　Top Left corner row/col Change
　Active Cell Change
Array
　Selection Change
　Value Change
　Top Left corner row/col Change
Picture
　Mouse Click
　Mouse Move
　Key Pressed/Down
Numeric
　Increment
　Decrement
　Value Change
　Initialized
Gauge
　Interpolation Changed
　Markers Changed
Knob
　Markers/Scale Changed
　Value Change
Numeric With Scale
　Active Thumb Changed
　Scale Info Changed
GraphChart
　Active X Scale Change
　Active Y Scale Change
　Plot Area Size Change
Waveform Chart
　Active Plot Change
　Update Mode Change
　Chart Cleared
　Plot Legend Visible
　Digital Display Visible
　Scrollbar Visible
　Xscale/Yscale visible
　Autoscale X
　Autoscale Y
Waveform Graph
　Active Plot Change
　Active Cursor Change
　Autoscale X
　Autoscale Y
　Smooth Update
　Graph Legend Visible
　Graph Palette visible
　Xscale/Yscale visible
Intensity Chart
　Scrollbar Visible
　Xscale/Yscale/Zscale visible
　Graph Palette Visible
　Chart Cleared
　Update Mode Changed
　Autoscale X/Y/Z changed
Intensity Graph
　Graph palette Visible
　Xscale/Yscale/Zscale visible
　Graph Cleared
　Autoscale X/Y/Z changed
　Smooth Update Enabled/Disabled
String
　Value Change FIGS. 16-18: Exemplary LabVIEW Graphical Program FIGS. 16-18 illustrate an exemplary LabVIEW graphical program that uses one embodiment of an event structure node. FIG. 16 illustrates the graphical user interface for the program. The graphical user interface includes a numeric control labeled "Change my Value" and a button control labeled "RESET". The graphical user interface also includes an LED indicator labeled "Value Change Event Occurred". When the user operates the numeric control to change its value, the graphical program receives a "value changed" event and responds by causing the LED indicator to light up. When the user clicks the button, the graphical program receives a "mouse click" event and responds by causing the LED to turn off.

FIG. 17 illustrates the block diagram of the LabVIEW graphical program. As shown, the block diagram includes an event structure node. In this example, the event structure node has two sub-diagrams, one for responding to the "value changed" event for the numeric control, and one for responding to the "mouse click" event for the button. In the FIG. 17 view of the block diagram, the sub-diagram for the "value changed" event is shown. In this case, the graphical source code shown in the sub-diagram simply causes the LED indicator to light up.

FIG. 18 is another view of the block diagram, in which the sub-diagram for the "mouse click" event is shown. In this case, the graphical source code shown in the sub-diagram simply causes the LED indicator to turn off.

FIGS. 16-18 are of course a very simple example for illustrative purposes, and user interface events may be used for more complex purposes. For example, the ability to receive user interface events may advantageously enable the graphical program to determine, for example, how the numeric control value was changed. For example, by configuring the program to respond to a "toggle arrow clicked" event for the numeric control instead of a "value changed" event, the program could cause the LED indicator to light up only when the numeric control value was changed by the user operating the control's toggle arrow and may ignore value changes caused by other operations, such as the user directly typing a new value into the control. This type of flexibility and level of detailed information regarding actions external to the graphical program may not be possible without the ability to receive and respond to user interface events.

Figure 19:
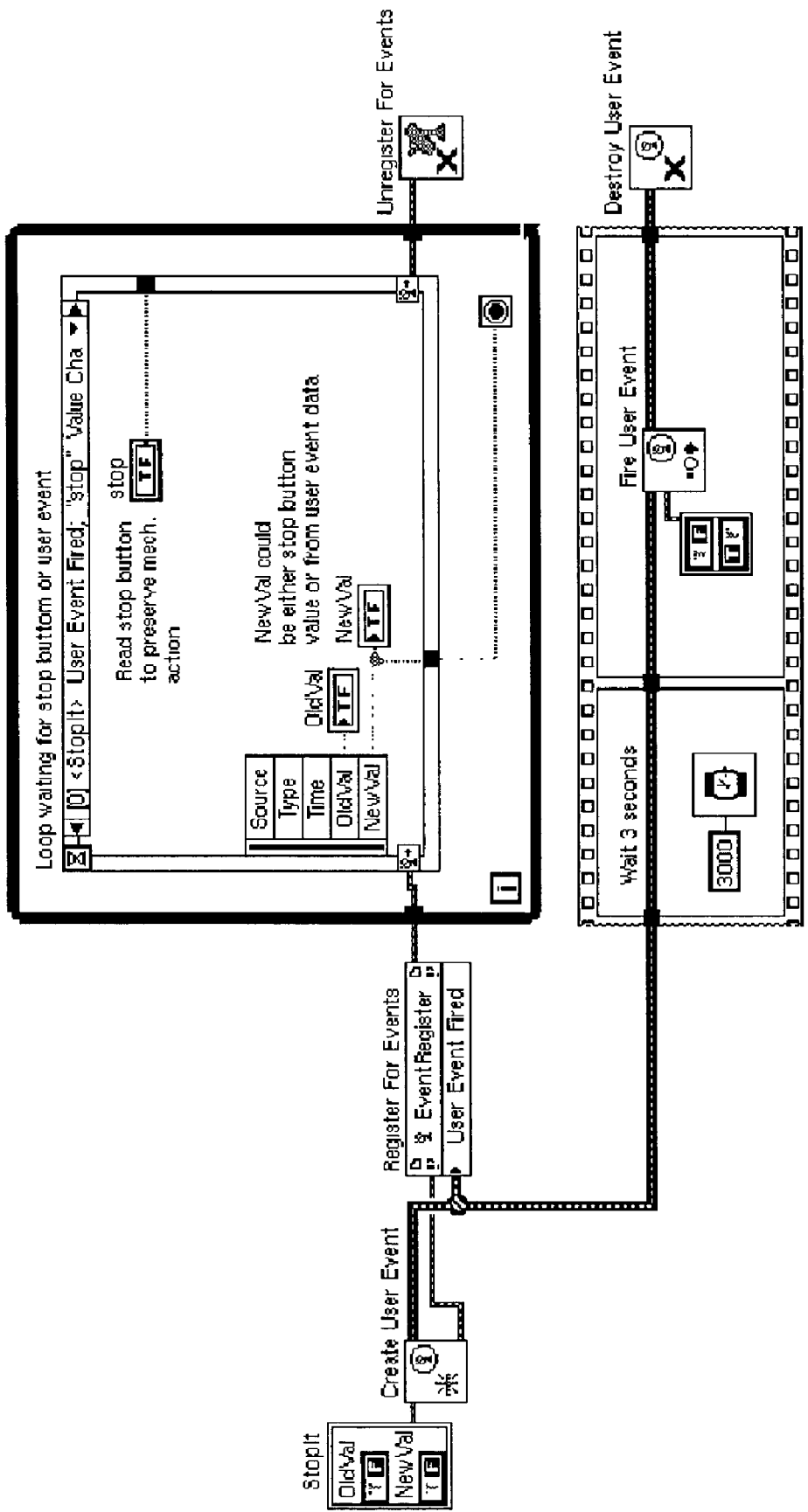
FIG. 19 illustrates a simple LabVIEW graphical program illustrating an exemplary use of a user-defined event.

FIG. 19—User-Defined Event Example

FIG. 19 illustrates a simple LabVIEW graphical program illustrating an exemplary use of a user-defined event. In this case, the user-defined event is used to simulate a user press on a stop button on the graphical program's user interface after three seconds have elapsed. As shown, a Create User Event executes to programmatically create a user-defined event, and a Register for Events node registers the user-defined event and associates the user-defined event with a sub-diagram of the event structure node. In this example, the sub-diagram also handles a user interface event generated when the user actually presses on the stop button. After three seconds, a Fire User Event node generates the user-defined event, causing the sub-diagram to execute to respond to the event.

This is just a simple example to demonstrate code sharing and the use of user-defined events. The functionality of this example could be more trivially achieved by simply using a timeout in the event structure. However, in a typical application, the condition for generating a user-defined event may be more sophisticated.

Although the embodiments above have been described in considerable detail, numerous variations and modifications will become apparent to those skilled in the art once the above disclosure is fully appreciated. It is intended that the following claims be interpreted to embrace all such variations and modifications.

We claim:

1. A computer-implemented method comprising:
executing a graphical program, wherein the graphical program comprises a plurality of interconnected nodes that visually indicate functionality of the graphical program, wherein the plurality of interconnected nodes includes a first one or more nodes operable to dynamically register a first event during execution of the graphical program, wherein said executing the graphical program includes executing the first one or more nodes; and
dynamically registering the first event during execution of the graphical program in response to said executing the first one or more nodes;
wherein said dynamically registering the first event enables the graphical program to respond to the first event when the first event is generated.

2. The method of claim 1,
wherein the graphical program comprises a graphical data flow program.

3. The method of claim 1, further comprising:
creating the graphical program, wherein said creating the graphical program comprises including the plurality of interconnected nodes in the graphical program, wherein including the plurality of interconnected nodes in the graphical program comprises including the first one or more nodes in the graphical program.

4. The method of claim 3,
wherein the first one or more nodes comprise an event registration node operable to dynamically register the first event during execution of the graphical program;
wherein said including the first one or more nodes in the graphical program comprises including the event registration node in the graphical program.

5. The method of claim 1, further comprising:
associating the first event with the event registration node in response to user input;
wherein said associating the first event with the first one or more nodes enables the first one or more nodes to dynamically register the first event during execution of the graphical program.

6. The method of claim 5,
wherein said associating the first event with the first one or more nodes comprises connecting one or more inputs to one or more input terminals of one or more of the first one or more nodes.

7. The method of claim 1, further comprising:
generating the first event during execution of the graphical program, after said dynamically registering the first event; and
the graphical program responding to the first event in response to said generating the first event.

8. The method of claim 1,
wherein the plurality of interconnected nodes includes a second one or more nodes operable to respond to the first event;
wherein said dynamically registering the first event includes dynamically associating the second one or more nodes with the first event so that the second one or more nodes execute when the first event is generated.

9. The method of claim 8, further comprising:
generating the first event during execution of the graphical program, after said dynamically registering the first event; and
executing the second one or more nodes in response to said generating the first event, wherein the second one or more nodes execute to respond to the first event.

10. The method of claim 1,
wherein the first event is a user-defined event.

11. The method of claim 1, wherein the first event comprises one of:
a user interface event;
a system event;
a timer event;
an event generated in response to data acquired from a device.

12. The method of claim 1,
wherein the graphical program includes a first user interface element;
wherein the first event is associated with the first user interface element.

13. The method of claim 12, further comprising:
generating the first event during execution of the graphical program, after said dynamically registering the first event, wherein the first event is generated in response to user input received to the first user interface element; and
the graphical program responding to the first event in response to said generating the first event.

14. The method of claim 1,
wherein the plurality of interconnected nodes includes a second one or more nodes operable to dynamically un-register the first event during execution of the graphical program after the first event has been dynamically registered;
wherein the method further comprises:
executing the second one or more nodes after said executing the first one or more nodes; and
dynamically un-registering the first event during execution of the graphical program in response to said executing the second one or more nodes;
wherein said dynamically un-registering the first event makes the graphical program stop responding to the first event when the first event is generated.

15. The method of claim 1,
wherein the first one or more nodes are further operable to dynamically register a second event during execution of the graphical program;
wherein the method further comprises dynamically registering the second event during execution of the graphical program in response to said executing the first one or more nodes;
wherein said dynamically registering the second event enables the graphical program to respond to the second event when the second event is generated.

16. A computer-implemented method for creating a graphical program, the method comprising:
displaying a first node in a block diagram of the graphical program in response to user input; and
associating one or more events with the first node in response to user input;
wherein the first node is operable to dynamically register the one or more events during execution of the graphical program;
wherein said dynamically registering the one or more events enables the graphical program to respond to the one or more events when the one or more events are generated.

17. The method of claim 16,
wherein the block diagram comprises a data flow block diagram.

18. The method of claim 16,
wherein said associating the one or more events with the first node comprises connecting one or more inputs to one or more input terminals of the first node.

19. The method of claim 16, further comprising:
executing the graphical program;
wherein said executing the graphical program comprises executing the first node;
wherein said executing the first node comprises dynamically registering the one or more events.

20. The method of claim 19,
wherein said dynamically registering the one or more events includes dynamically registering a first event;
wherein the method further comprises:
generating the first event during execution of the graphical program, after said dynamically registering the first event; and
the graphical program responding to the first event in response to said generating the first event.

21. The method of claim 20, further comprising:
displaying a plurality of nodes in the block diagram of the graphical program for responding to the first event in response to user input;
interconnecting the plurality of nodes in response to user input, wherein the interconnected nodes visually indicate functionality for responding to the first event;
executing the plurality of interconnected nodes in response to said generating the first event, wherein the plurality of interconnected nodes executes to respond to the first event.

22. The method of claim 16, wherein the one or more events include one or more events from the group consisting of:
user interface events;
system events; and
timer events.

23. The method of claim 16, further comprising:
displaying a second node in the block diagram of the graphical program in response to user input; and
associating one or more of the events registered by the first node with the second node in response to user input;
wherein the second node is operable to dynamically un-register the one or more events associated with the second node after the one or more events associated with the second node have been dynamically registered by the first node;
wherein said dynamically un-registering the one or more events associated with the second node disables the graphical program from responding to the one or more events associated with the second node when the one or more events associated with the second node are generated.

24. A computer-readable memory medium storing program instructions executable to:
execute a graphical program, wherein the graphical program comprises a plurality of interconnected nodes that visually indicate functionality of the graphical program, wherein the plurality of interconnected nodes includes a first one or more nodes operable to dynamically register a first event during execution of the graphical program, wherein said executing the graphical program includes executing the first one or more nodes; and
dynamically register the first event during execution of the graphical program in response to said executing the first one or more nodes;

wherein said dynamically registering the first event enables the graphical program to respond to the first event when the first event is generated.

25. The computer-readable memory medium of claim 24, wherein the program instructions are further executable to:
associate the first event with the first one or more nodes in response to user input;
wherein said associating the first event with the first one or more nodes enables the first one or more nodes to dynamically register the first event during execution of the graphical program.

26. The computer-readable memory medium of claim 24, wherein the plurality of interconnected nodes includes a second one or more nodes operable to respond to the first event;
wherein said dynamically registering the first event includes dynamically configuring the second one or more nodes to execute in response to the first event being subsequently generated.

27. The computer-readable memory medium of claim 24, wherein the first event comprises one of:
a user interface event;
a system event;
a timer event;
an event generated in response to data acquired from a device.

28. The computer-readable memory medium of claim 24, wherein the plurality of interconnected nodes includes a second one or more nodes operable to dynamically un-register the first event during execution of the graphical program after the first event has been dynamically registered;
wherein the program instructions are further executable to:
execute the second one or more nodes after said executing the first one or more nodes; and
dynamically un-register the first event during execution of the graphical program in response to said executing the second one or more nodes;
wherein said dynamically un-registering the first event makes the graphical program stop responding to the first event when the first event is generated.

29. A system comprising:
one or more processors; and
memory storing program instructions;
wherein the program instructions are executable by the one or more processors to:
execute a graphical program, wherein the graphical program comprises a plurality of interconnected nodes that visually indicate functionality of the graphical program, wherein the plurality of interconnected nodes includes a first one or more nodes operable to dynamically register a first event during execution of the graphical program, wherein said executing the graphical program includes executing the first one or more nodes; and
dynamically register the first event during execution of the graphical program in response to said executing the first one or more nodes;
wherein said dynamically registering the first event enables the graphical program to respond to the first event when the first event is generated.

30. A computer-readable memory medium storing program instructions executable to:
display a first node in a block diagram of a graphical program in response to user input;
associate one or more events with the first node in response to user input; and
dynamically register the one or more events in response to executing the first node during execution of the graphical program;
wherein said dynamically registering the one or more events enables the graphical program to respond to the one or more events when the one or more events are generated.

31. The computer-readable memory medium of claim 30, wherein the program instructions are further executable to:
display a plurality of nodes in the block diagram of the graphical program for responding to the first event in response to user input;
interconnect the plurality of nodes in response to user input, wherein the interconnected nodes visually indicate functionality for responding to the first event;
wherein said dynamically registering the one or more events includes configuring the interconnected nodes to execute in response to the first event being subsequently generated.

32. The computer-readable memory medium of claim 30, wherein the program instructions are further executable to:
display a second node in the block diagram of the graphical program in response to user input;
associate one or more of the events registered by the first node with the second node in response to user input; and
after the one or more events associated with the second node have been dynamically registered by the first node, dynamically un-register the one or more events associated with the second node in response to executing the second node;
wherein said dynamically un-registering the one or more events associated with the second node disables the graphical program from responding to the one or more events associated with the second node when the one or more events associated with the second node are generated.

33. A system comprising:
one or more processors; and
memory storing program instructions;
wherein the program instructions are executable by the one or more processors to:
display a first node in a block diagram of a graphical program in response to user input;
associate one or more events with the first node in response to user input; and
dynamically register the one or more events in response to executing the first node during execution of the graphical program;
wherein said dynamically registering the one or more events enables the graphical program to respond to the one or more events when the one or more events are generated.

* * * * *

UNITED STATES PATENT AND TRADEMARK OFFICE
CERTIFICATE OF CORRECTION

PATENT NO.         : 7,594,182 B2                                              Page 1 of 1
APPLICATION NO.    : 10/218701
DATED              : September 22, 2009
INVENTOR(S)        : King et al.

It is certified that error appears in the above-identified patent and that said Letters Patent is hereby corrected as shown below:

<u>Column 26</u>
Line 35, please delete "first event with the event registration node in response" and substitute -- first event with the first one or more nodes in response --.

Signed and Sealed this

Third Day of November, 2009

David J. Kappos
*Director of the United States Patent and Trademark Office*

UNITED STATES PATENT AND TRADEMARK OFFICE
CERTIFICATE OF CORRECTION

PATENT NO. : 7,594,182 B2 Page 1 of 1
APPLICATION NO. : 10/218701
DATED : September 22, 2009
INVENTOR(S) : King et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 2034 days.

Signed and Sealed this

Twenty-eighth Day of September, 2010

David J. Kappos
*Director of the United States Patent and Trademark Office*